United States Patent
Schiavone et al.

(10) Patent No.: US 7,647,411 B1
(45) Date of Patent: *Jan. 12, 2010

(54) SYSTEM AND METHOD FOR CONTROLLING DISTRIBUTION OF NETWORK COMMUNICATIONS

(75) Inventors: Vincent J. Schiavone, Berwyn, PA (US); David Ian Brussin, Berwyn, PA (US); Tobias Phillip DiPasquale, Exton, PA (US); John Francis D'Alessio, West Chester, PA (US)

(73) Assignee: Symantec Corporation, Mountain View, CA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 10/841,776

(22) Filed: May 7, 2004

Related U.S. Application Data

(63) Continuation-in-part of application No. 10/084,038, filed on Feb. 26, 2002, now Pat. No. 7,415,504.

(60) Provisional application No. 60/271,521, filed on Feb. 26, 2001, provisional application No. 60/543,803, filed on Feb. 11, 2004.

(51) Int. Cl.
  *G06F 15/16* (2006.01)
  *G06F 15/173* (2006.01)
(52) U.S. Cl. .................. 709/229; 709/206; 709/207; 709/223; 709/224; 709/225; 709/226; 709/233
(58) Field of Classification Search ............ None
  See application file for complete search history.

(56) References Cited

U.S. PATENT DOCUMENTS

| | | | |
|---|---|---|---|
| 3,969,723 | A | 7/1976 | Kennicott |
| 4,558,413 | A | 12/1985 | Schmidt et al. |
| 4,714,992 | A | 12/1987 | Gladney et al. |

(Continued)

FOREIGN PATENT DOCUMENTS

EP  0230616 A2  8/1987

(Continued)

OTHER PUBLICATIONS

U.S. Appl. No. 10/211,827, filed Aug. 2, 2002, Nachenberg.

(Continued)

*Primary Examiner*—Hassan Phillips
(74) *Attorney, Agent, or Firm*—Fenwick & West LLP

(57) ABSTRACT

A network appliance controls access to network resources by identifying network paths passing through the network appliance to a protected network, drawings conclusions about the type of communications traveling along those paths, and then controlling, i.e. limiting, access to the protected network's resources for transmitting communications on a path-by-path basis. Recipient controlled mechanisms are used to control access to the recipient's network's resources, namely, restricting bandwidth, controlling allocation of SMTP or other connections, and packet level traffic shaping techniques including controlling of parameters of TCP and/or IP communications, such as TCP receive window size and Maximum Segment Size, or otherwise decreasing the amount of network traffic per unit of time passing through the network appliance. This limits the amount of network resources that may be used by incoming communications. Multiple network appliances may communicate with one another to operate in concert to protect a greater portion of network resources.

22 Claims, 6 Drawing Sheets

U.S. PATENT DOCUMENTS

| | | | |
|---|---|---|---|
| 4,809,170 A | 2/1989 | Leblang et al. | |
| 4,962,532 A | 10/1990 | Kasiraj et al. | 380/25 |
| 5,155,847 A | 10/1992 | Kirouac et al. | |
| 5,182,806 A | 1/1993 | McKeeman et al. | |
| 5,204,960 A | 4/1993 | Smith et al. | |
| 5,377,354 A | 12/1994 | Scannel et al. | 395/650 |
| 5,479,654 A | 12/1995 | Squibb | |
| 5,485,575 A | 1/1996 | Chess et al. | |
| 5,488,609 A * | 1/1996 | Hluchyj et al. | 370/232 |
| 5,495,610 A | 2/1996 | Shing et al. | |
| 5,508,817 A | 4/1996 | Kunigami | 358/402 |
| 5,519,866 A | 5/1996 | Lawrence et al. | |
| 5,555,346 A | 9/1996 | Gross et al. | 395/51 |
| 5,557,723 A | 9/1996 | Holt et al. | 395/149 |
| 5,566,335 A | 10/1996 | Nash et al. | |
| 5,574,906 A | 11/1996 | Morris | |
| 5,581,764 A | 12/1996 | Fitzgerald et al. | |
| 5,613,108 A | 3/1997 | Morikawa | 393/616 |
| 5,619,648 A | 4/1997 | Canale et al. | 395/200.01 |
| 5,649,200 A | 7/1997 | Leblang et al. | |
| 5,671,398 A | 9/1997 | Neubauer | |
| 5,673,387 A | 9/1997 | Chen et al. | |
| 5,684,875 A | 11/1997 | Ellenberger | |
| 5,694,616 A | 12/1997 | Johnson et al. | 395/860 |
| 5,699,275 A | 12/1997 | Beasley et al. | |
| 5,717,923 A | 2/1998 | Dedrick | 395/613 |
| 5,729,743 A | 3/1998 | Squibb | |
| 5,774,552 A | 6/1998 | Grimmer | 380/25 |
| 5,781,901 A | 7/1998 | Kuzma | 707/10 |
| 5,790,856 A | 8/1998 | Lillich | |
| 5,794,210 A | 8/1998 | Goldhaber et al. | 705/14 |
| 5,799,189 A | 8/1998 | Koser et al. | |
| 5,832,220 A | 11/1998 | Johnson et al. | 395/200.36 |
| 5,883,946 A | 3/1999 | Beck et al. | |
| 5,892,900 A | 4/1999 | Ginter et al. | 395/186 |
| 5,893,113 A | 4/1999 | McGrath et al. | |
| 5,903,880 A | 5/1999 | Biffar | 705/39 |
| 5,905,896 A | 5/1999 | Delannoy | |
| 5,909,581 A | 6/1999 | Park | |
| 5,911,048 A | 6/1999 | Graf | 395/200.54 |
| 5,917,489 A | 6/1999 | Thurlow et al. | 345/347 |
| 5,933,647 A | 8/1999 | Aronberg et al. | |
| 5,933,811 A | 8/1999 | Angles et al. | 705/14 |
| 5,948,058 A | 9/1999 | Kudoh et al. | 709/206 |
| 5,948,104 A | 9/1999 | Gluck et al. | |
| 5,953,532 A | 9/1999 | Lochbaum | |
| 5,960,204 A | 9/1999 | Yinger et al. | |
| 5,960,411 A | 9/1999 | Hartman et al. | 705/26 |
| 5,974,033 A * | 10/1999 | Kamiya et al. | 370/230.1 |
| 5,999,967 A | 12/1999 | Sundsted | 709/206 |
| 6,006,034 A | 12/1999 | Heath et al. | |
| 6,006,242 A | 12/1999 | Poole et al. | |
| 6,035,423 A | 3/2000 | Hodges et al. | |
| 6,052,531 A | 4/2000 | Waldin, Jr. et al. | |
| 6,057,841 A | 5/2000 | Thurlow et al. | 345/347 |
| 6,073,142 A | 6/2000 | Geiger et al. | 707/500 |
| 6,081,814 A | 6/2000 | Mangat et al. | |
| 6,088,803 A | 7/2000 | Tso et al. | |
| 6,091,947 A | 7/2000 | Sumner | |
| 6,092,080 A | 7/2000 | Gustman | |
| 6,119,165 A | 9/2000 | Li et al. | |
| 6,134,658 A | 10/2000 | Multerer et al. | 713/175 |
| 6,138,146 A | 10/2000 | Moon et al. | 709/206 |
| 6,145,079 A | 11/2000 | Mitty et al. | 713/170 |
| 6,146,026 A | 11/2000 | Ushiku | 395/200.37 |
| 6,147,977 A | 11/2000 | Thro et al. | 370/265 |
| 6,151,643 A | 11/2000 | Cheng et al. | |
| 6,161,130 A | 12/2000 | Horvitz et al. | 709/206 |
| 6,161,181 A | 12/2000 | Haynes et al. | 713/170 |
| 6,163,807 A * | 12/2000 | Hodgkinson et al. | 709/229 |
| 6,178,551 B1 | 1/2001 | Sana et al. | |
| 6,185,603 B1 | 2/2001 | Henderson et al. | 709/206 |
| 6,199,081 B1 | 3/2001 | Meyerzon | 707/513 |
| 6,260,059 B1 | 7/2001 | Ueno et al. | 709/202 |
| 6,278,709 B1 | 8/2001 | Walker et al. | |
| 6,317,789 B1 * | 11/2001 | Rakavy et al. | 709/224 |
| 6,334,140 B1 | 12/2001 | Kawamata | |
| 6,345,256 B1 | 2/2002 | Milsted et al. | 705/1 |
| 6,349,407 B1 | 2/2002 | Towfiq | |
| 6,363,415 B1 | 3/2002 | Finney et al. | 709/206 |
| 6,374,237 B1 | 4/2002 | Reese | 707/3 |
| 6,418,555 B2 | 7/2002 | Mohammed | |
| 6,421,669 B1 | 7/2002 | Gilmour et al. | 707/9 |
| 6,442,593 B1 | 8/2002 | Wang et al. | |
| 6,460,036 B1 | 10/2002 | Herz | 707/10 |
| 6,460,050 B1 | 10/2002 | Pace et al. | 707/104.1 |
| 6,480,471 B1 * | 11/2002 | VanZante et al. | 370/252 |
| 6,484,315 B1 | 11/2002 | Ziese | |
| 6,490,587 B2 | 12/2002 | Easty et al. | 707/10 |
| 6,493,722 B1 | 12/2002 | Daleen et al. | 707/104.1 |
| 6,510,552 B1 | 1/2003 | Benayoun et al. | |
| 6,535,894 B1 | 3/2003 | Schmidt et al. | |
| 6,609,196 B1 | 8/2003 | Dickinson et al. | 713/154 |
| 6,643,258 B1 * | 11/2003 | Ise et al. | 370/230 |
| 6,651,249 B2 | 11/2003 | Waldin et al. | |
| 6,654,787 B1 * | 11/2003 | Aronson et al. | 709/206 |
| 6,735,702 B1 * | 5/2004 | Yavatkar et al. | 726/13 |
| 6,771,765 B1 | 8/2004 | Crowther et al. | |
| 6,941,304 B2 | 9/2005 | Gainey et al. | |
| 7,050,445 B1 | 5/2006 | Zellner et al. | |
| 7,065,042 B1 * | 6/2006 | Pan et al. | 709/226 |
| 7,107,334 B1 * | 9/2006 | Shaffer et al. | 709/224 |
| 7,146,402 B2 | 12/2006 | Kucherawy | |
| 7,194,681 B1 * | 3/2007 | Horvitz | 709/207 |
| 7,340,529 B1 * | 3/2008 | Yazaki et al. | 709/232 |
| 7,349,979 B1 * | 3/2008 | Cieslak et al. | 709/238 |
| 7,437,428 B1 * | 10/2008 | Muti et al. | 709/224 |
| 2001/0018739 A1 | 8/2001 | Anderson et al. | 713/176 |
| 2001/0039579 A1 * | 11/2001 | Trcka et al. | 709/224 |
| 2002/0007400 A1 | 1/2002 | Pedersen | 709/206 |
| 2002/0112057 A1 * | 8/2002 | Srinivas et al. | 709/226 |
| 2002/0120705 A1 | 8/2002 | Schiavone et al. | 709/207 |
| 2004/0133776 A1 | 7/2004 | Putzolu | |
| 2007/0041331 A1 * | 2/2007 | Ma et al. | 709/223 |

FOREIGN PATENT DOCUMENTS

| | | |
|---|---|---|
| EP | 0735474 A2 | 10/1996 |
| EP | 0774720 A2 | 5/1997 |
| WO | WO 96/32679 A1 | 10/1996 |
| WO | WO 99/22325 A1 | 5/1999 |
| WO | WO 00/29945 A1 | 5/2000 |
| WO | 01/37123 A3 | 5/2001 |

OTHER PUBLICATIONS

"User-Friendly Interface for Applying Specific Levels of Coordinated Updates to Software in the Field," IBM Technical Disclosure Bulletin, vol. 31, No. 10, Mar. 1989, Armonk, NY, U.S.A.

Ambriola, Vincenzo; Bendix, Lars; and Ciancarini, Paolo, "The Evolution of Configuration Management and Version Control," Software Engineering Journal, Nov. 1990, pp. 303-310, retrieved from IEEE database, Sep. 24, 2002, U.S.A.

CAUCE.org web pages [online] Coalition Against Unsolicited Commercial Email [retrieved Mar. 17, 2003] Retrieved from the Internet: <URL: http://www.cauce.org/about/problem.shtml>.

Grundy, et al., "Support for Collaborative, Integrated Software Development," Proc 95 Software Engineering Environments, Abstract Only, Apr. 1995, U.S.A.

Hedin, Gorel, "Incremental Execution In A Programming Environment Based On Compilation," Proc. Of Nineteenth Hawaii Intl. Conf. On System Sciences, Abstract Only, Jan. 1986, U.S.A.

Hurwitz Group, "Application Management for Distributed Applications," pp. 1-7, Jun. 1998, U.S.A.

Lindsay, Peter; Liu, Yaowei, and Traynor, Owen, "A Generic Model for Fine Grained Configuration Management Including Version Control and Traceability," 1997 IEEE, retrieved from the IEEE database Sep. 24, 2002, U.S.A.

Marimba, "Castanet 3.0 Product Family," Jun. 1998, U.S.A.

Marimba, "Castanet Infrastructure Suite," Jun. 1998, U.S.A.

Marimba, "Castanet Management Suite," Jun. 1988, U.S.A.

Marimba, "Castanet Production Suite," Jun. 1998, U.S.A.

Pocket Soft, ".RTPatch® Professional for Windows, NT, and DOS Binary Update System," pp. 1-6. Jun. 23, 1998, http://www.pocketsoft.com\whtwind.html, U.S.A.

Pollock, Lori, "Incremental Version of Iterative Data Flow Analysis," IEEE Trans Software Eng., v 15, n 12, Abstract Only, Dec. 1989, U.S.A.

Reichenberger, Christoph, "Orthogonal Version Management," Universitat Linz, Institute fur Informatik, Austria, 1989 ACM.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

MacNamra, John E., "Technical Aspects of Data Communication", 2ed. 1982, Digital Equipment Corporation, U.S.A. pp. 110-122.

"Gold Parser, A Free Multi-Platform Parser Generator", [online] devincook.com [retrieved Oct. 7, 2003] Retrieved from the Internet: <URL: http://www.devincook.com/goldparser/index.htm>.

"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.

Ore, Oystein, "Number Theory and Its History", 1976 Gudron Ore, U.S.A. pp. 124-129.

Faith Cranor, L., LaMacchia, Brian A., Spam! *Communications of the ACM*. vol. 41, No. 8 pp. 74-83 (Aug. 1998).

Keneipp, Ray, Traffic Shaping [online], May 14, 2001 [retrieved on Apr. 27, 2004]. Retrieved from the Internet: <URL: ITworld.com—Supersite Manager—Traffic Shaping http://www.itworld.com/nl/sup_mgr/05142001/>.

ISP-Planet Staff, Slower Spam Would Annoy Spammers [online], Feb. 20, 2003 [retrieved on Apr. 29, 2004]. Retrieved from the Internet: <URL: ISP-Planet—Equipment—Slower Spam Would Annoy Spammers http://www.isp-planet.com/equipment/2003/spamsquelcher.html>.

Wagner, Mitch, Tool Uses Network Analysis To Fight Spam [online], [retrieved on Apr. 29, 2004]. Retrieved from the Internet: URL: Internet Week>E-Mail>Tool Uses Network Analysis To Fight Spam>Feb. 13, 2003 http://www.internetweek.com/story/showArticle.jhtml?articleID=6900032>.

PR Newswire, SpamSquelcher Technology cuts Costly Impact of Spam on Enterprises and ISPs; New Product from ePrivacy Group Turns Back Spam Attacks With False Positives [online], Feb. 11, 2003 [Retrieved on May 3, 2004]. Retrieved from the Internet: <URL: PR Newswire SpamSquelcher Technology Cuts costly Impact of Spam on Enterprises a . . . http://www.findarticles.com/cf_dls/m4PRN/2003_Feb_11/97463210/p1/article.jhtml>.

Jee, et al., "A Generic Virus Detection Agent on the Internet", pp. 210-219, 1997 IEEE, retrieved May 10, 2006, Taiwan.

Bellare et al., "Incremental Cryptography and Application to Virus Protection", pp. 45-56, 1995 ACM, retrieved May 10, 2006, New York, NY.

Conradi, R. et al., "Configuring Versioned Software Products," Department of CS and Telematics, Norwegian Institute of Technology, Trondheim, Norway, 1996, retrieved from http://citeseer.nj.nec.com/conradi96 on Sep. 24, 2002.

"Description of Windows 2000 Windows File Protection Feature (Q222193)," [Online], First published May 26, 1999, last modified Jan. 12, 2002, [Retrieved on Apr. 9, 2002] Retrieved from the Internet<URL:http://support.microsoft.com/default.aspx?scid=kb:EN-US;q222193>.

Suk Oh, A. et al., "An Incremental Update Propagation Scheme for a Cooperative Transaction Model," Proc. 7th Intl. Workshop on Database and Expert Systems Appl., Abstract Only, Sep. 1996, U.S.A.

"System File Protection and Windows ME," [Online], last updated Dec. 4, 2001, [Retrieved on Apr. 9, 2002] Retrieved from the Internet:<URL:http://www.Microsoft.com/hwdev/archive/sfp/winME_sfpP.asp>.

* cited by examiner

SYSTEM AND METHOD FOR CONTROLLING DISTRIBUTION OF NETWORK COMMUNICATIONS

CROSS-REFERENCE TO RELATED APPLICATIONS

This application is a continuation in part of U.S. patent application Ser. No. 10/084,038, filed Feb. 26, 2002, which claims the benefit of U.S. Patent Application No. 60/271,521, filed Feb. 26, 2001, and this application claims the benefit of U.S. Patent Application No. 60/543,803, filed Feb. 11, 2004, the entire disclosure of each of these applications being hereby incorporated herein by reference.

FIELD OF THE INVENTION

The present invention relates generally to the field of network communications, and in particular to a system and method for controlling distribution of network communications to reduce the burden of such communications on recipient and intermediate networks.

BACKGROUND

Electronic mail messaging and other network communications via computerized communications networks is widespread. In addition to responsible, desirable use of such communications, there is an increasing use of such communications, particularly e-mail messages, for sending undesirable unsolicited messages, primarily for commercial purposes. Bulk unsolicited commercial e-mail ("UCE") messages are typically referred to as "spam." Spam senders and other irresponsible senders of messages (collectively, "spammers") may send UCE messages easily and inexpensively, and thus tend to send as many as desired. In contrast, message recipients, their messaging systems, and any intermediate messaging systems, bear virtually the entire processing and financial burdens for transmitting all such messages. Accordingly spammers may, at will, undesirably burden messaging systems, e.g. by using network bandwidth, mail server and other messaging system resources, by sending as many messages as they desire.

Current mail messaging systems have no adequate way to ensure Quality of Service ("QoS") and/or priority treatment of electronic mail ("e-mail") processing. For example, QoS problems often arise in the context of spam attacks—i.e. large mass mailings of UCE messages. A common method for sending spam is the "dictionary attack." Another common method for sending spam is the "brute force" method in which various alphanumeric combinations are tried for selected domains, whether the addresses are known to be valid or not. This creates a particularly heavy burden on communications network resources. This unfettered use effectively results in theft and abuse of mail messaging system resources of messages receivers. Enterprise networks, government and public agency networks, as well as Internet Service Providers, are particularly adversely affected.

Traditional attempts to control undesired e-mail messages involve the use of messages filters, which typically operate at the SMTP level, i.e. at the Application Layer of the OSI seven layer model. Such filters are configured to take one of four actions with respect to each incoming message, namely, Deliver the message to the intended recipient, Delete the message, Reject the message during the SMTP protocol conversation, or Quarantine the message (typically by delivering to an alternate computer file folder for human review). These filters, termed "DDRQ" filters, may conserve resources at the client device, but they are not effective for limiting the impact of UCE on the recipient's or any intermediate network/messaging system resources. In other words, such filters are inadequate for preventing the theft and abuse of the network/system resources (including server capacity, software licenses, administrative/processing time, network infrastructure, bandwidth, storage, etc) necessary to receive, process and filter each message along the network in the process of delivery the message to the end user/the end user's messaging system. For example, even if a DDRQ filter rejects an SMTP message during the SMTP protocol conversation, that message still uses up to 90% of the network/messaging system resources that would have been consumed had delivery to the intended recipient been completed.

Additionally, the processing work performed and the network resources required increase proportionally to the total volume of messages received. In other words, spammers that send UCE to a recipient that is using a traditional DDRQ filter effectively necessitate an increase in capacity of the filter infrastructure, along with the rest of the impacted messaging system's network resources, as a result of the spammers' behavior. Failure to scale system capacity to accommodate the spammers' sending rate results in overloading of the network's resources and loss of legitimate communications. Accordingly, spammers' activities directly impact the effectiveness and/or costs of recipients' and intermediaries' messaging systems. This is particularly alarming in view of the observed growth in UCE volumes. Increased costs of implementing and/or maintaining messaging systems are felt particularly heavily by corporations and other enterprises that rely heavily on e-mail messages, and that support a large number of recipients/e-mail addresses.

Of particular concern is the observed behavior of spammers when faced with DDRQ filtering. Such spammers typically respond to increasing DDRQ filter effectiveness by increasing their own outgoing message volumes in order to maintain or grow their total responses and resulting profits. This is thought to be a key component of the current upswing in UCE volume growth rates since spammers realize that a DDRQ filter that is anything less than 100% efficient will allow an increased amount of spam to reach intended recipients as UCE volumes increase.

What is needed is a system and method for controlling distribution of network communications that reduce the burden on network resources of recipients and intermediaries and/or allows for distribution of network communications in a controlled manner.

SUMMARY

We have determined that conventional SMTP-based solutions for reducing UCE/spam and/or conserving a recipient's network resources are ineffective and/or unsatisfactory because SMTP is essentially sender controlled; receiver's network resources are basically used to process all incoming SMTP communications, although some may be eventually rejected by a DDRQ filter or the like. In view of the proliferation of UCE, and the associated theft/abuse of receivers' network resources, the present invention provides a network appliance that is specially configured to control/limit the use of such network resources according to the preferences of the recipient. The network appliance operates through control of the means of access to such resources, namely, recipient-controlled aspects of the availability of such resources. More particularly, the network appliance controls access to network resources by operating at OSI model layers 3 (Network layer)

and 4 (Transport layer), where the IP (layer 3) and TCP (layer 4) protocols operate. Optionally, the network appliance may also operate at the SMTP transaction level, and analyze the message content itself. Accordingly, the amount of network resources for processing undesired communications may be limited and/or controlled by the recipient's network. In this manner, spammers/senders lose their ability to have unfettered use and consumption of recipients' messaging systems' resources; the network transmission mechanisms for transmitting communications are controlled by the recipient. The present invention is equally applicable to other message and non-message type network communications.

When positioned between an associated protected internal network/subnetwork, and the upstream network connectivity and/or external networks/the internet, the network appliance impacts and/or manipulates network communications before they enter the protected network and/or at its perimeter, which is in contrast to the traditional accept-then-decide anti-spam approach involving message filtering after such messages have entered the recipient's network. Thus, by reducing the amount of UCE entering the protected network, spammers' theft/abuse of IT resources needed to receive and process such unwanted communications is reduced. As a result, legitimate traffic is handled more effectively and efficiently, and any additional protection mechanisms within the protected network, such as anti-virus software and e-mail content filtering, can operate more effectively, and with far fewer resources. By making sending of messages to the protected network inefficient, the network appliance disrupts the economic model that encourages enormous volumes of spam messages.

The network appliance combines intelligent identification of network paths, sampling of network traffic, out-of-band analysis of this traffic and the data within, and network resource controls, to limit the use of proprietary network resources by spammers while effectively prioritizing the communications of legitimate senders. Conclusions about network paths, or more particularly communications arriving on a common network path, are drawn based on overall analysis of many communications, and not just a single communication. Various sampling and analysis techniques, including many known techniques, may be used to draw a conclusion about whether communications arriving on a certain network path are undesirable. For example, various anti-virus, spam detection and content filtering software exist for this purpose.

Once a conclusion has been drawn about a particular network path (e.g., that legitimate communications arrive on that path, that spam, virus-laden or other undesirable communications arrive on that path, etc.), the network appliance uses a resource control mechanism to control how much of the protected network's resources can be used to process communications arriving on that path. In particular, the network appliance may use traffic shaping (such as TCP and/or /IP traffic shaping techniques) to exploit the connection-oriented nature of TCP and the existing error control and Quality of Service (QoS) features of TCP. This effectively controls the rate at which such packets leave the sender's network. Accordingly, undesired communications intended for delivery to the protected network to back up at the spammer's outgoing mail server, frequently causing the spammer's software to drop the connection and move on to a more promising target network. Alternatively, the network appliance may use connection shaping techniques to limit resource use, such as limiting a number of concurrent connections, limiting a connection frequency, limit a total number of connections, limiting a total number of connections per class of connection, limiting a number of messages per connection, etc. All of these techniques control the rate at which packets/communications are permitted to pass through the network appliance and enter the protected network.

Accordingly, network resource savings are provided for an entire protected network. Further, because messages need not be rejected, there need not be any delivery failures resulting from false positive determinations of whether certain messages are spam. Instead, the message's delivery is merely delayed. Erroneous determinations of whether a certain message is spam, etc. are minimal because a determination for a single message is based upon a statistical analysis of multiple messages traveling the same or a similar network path, instead of an analysis of the single message.

In a preferred embodiment, the network appliance provides dynamic, IP-level (OSI model, Network layer, layer 3) and/or TCP level (OSI model, Transport layer, layer 4) network traffic shaping based on sampling and analysis of SMTP traffic at the packet level. By way of example, the TCP traffic shaping techniques include restricting bandwidth, controlling allocation of SMTP or other connections, controlling other parameters of communications, such as TCP receive window size and Maximum Segment Size, or otherwise decreasing the amount of network traffic per unit of time passing through the network appliance and/or into the protected network. This permits the recipient/recipient's network to directly limit/control the amount of network resources that are permitted to be used by incoming messages. The amount of network resources per path may be selectively varied as desired according to the network administrator's preferences, e.g. to provide for less network resource utilization by TCP packets, IP packets, or other network communications arriving on a certain network path, or having a certain characteristic, and to provide for more network resource utilization on another path. Limiting the rate at which communications can enter the protected network has the advantageous effect of pushing the burden of handling/processing/transmitting such undesirable communications toward and/or to the sender/sender's network, while relieving downstream networks of associated message handling/processing burdens. This disrupts spam senders' ability to deliver a high volume of their undesirable communications and/or makes such delivery intolerably inefficient for spam senders, thereby discouraging spam sending to such protected networks.

In a certain embodiment, data is synchronized such that multiple network appliances communicate with one another and/or operate in concert. More specifically, once a certain network appliance identifies a network path for which it is desirable to limit network resource utilization, it may communicate such information to other network appliances and/or a centralized device for gathering and disseminating such information to other network appliances, e.g. those that are upstream on that network path/mailstream, those that are in other mailstreams, etc. This limits the use of network resources within other networks.

Optionally, the network appliance may be integrated into a subnetwork at layer 2 of the OSI model (the Data Link layer), thereby providing an anti-spam/resource control product that is completed transparent to the higher layers of the network/users, and thus requiring no changes to mail servers, applications, etc.

BRIEF DESCRIPTION OF THE DRAWINGS

The present invention will now be described by way of example with reference to the following drawings in which.

DETAILED DESCRIPTION

Figure 1:
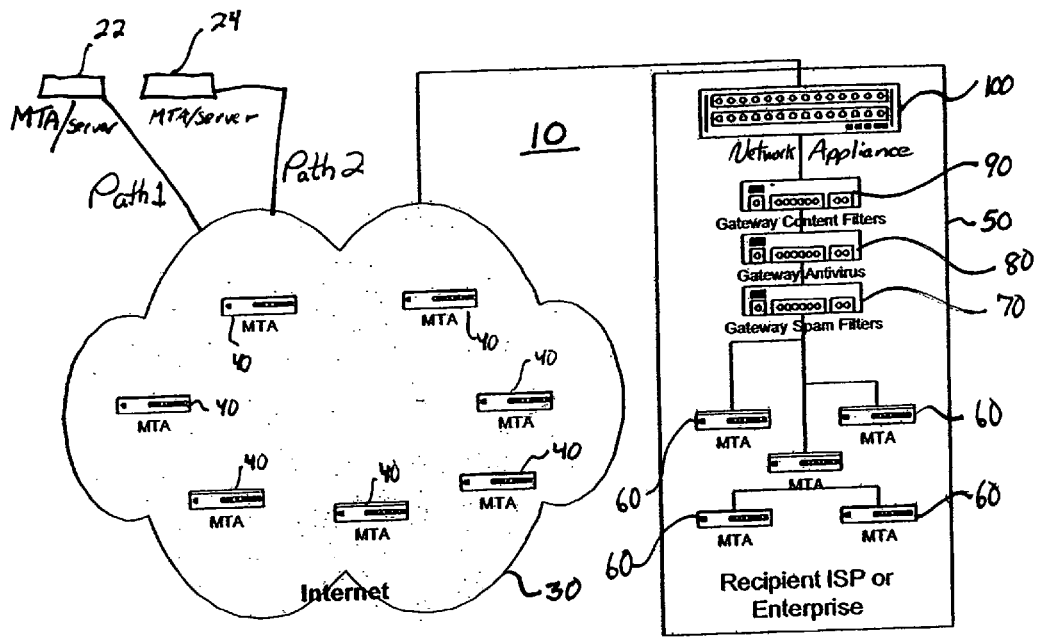
FIG. 1 is a block diagram of an exemplary system and communications network environment in accordance with the present invention.

The present invention provides a specially configured network appliance that allows a network administrator to control/limit use of the network's resources by others. Conceptually, control is exercised by limiting access to the resources used to route/deliver communications with the network. More specifically, the network appliance imposes network resource utilization limits to ensure that the protected network's resources are used according to the preferences of the network's administrator, and thereby prevents unfettered use of proprietary network resources by spammers, etc. This is in contrast to use of an internal network's resources according to the demands placed on it by external networks and/or spammers.

In accordance with the present invention, distribution is controlled by controlling use and/or allocation of and/or access to network resources for delivery of certain groups of communications, e.g. SMTP messages. The communications are grouped for analysis and control, according to a network path, or a component thereof, or source (collectively "network path") on which they arrive at the network appliance. Analysis and control of resources on a path-wise basis, instead of on the basis of characteristics of a discrete communication, is advantageous because it is extremely difficult for a spammer/sender to hide network path information for a communication. Accordingly, the network appliance responds very differently than traditional anti-spam solutions. Using various techniques, conclusions are drawn about communications arriving on each network path passing through the network appliance. With or without additional logic, this effectively assigns a relative priority level to each network path. Allocation of network resources is then controlled to permit a greater proportion of resources to be used for transmitting higher priority, more important communications, and a lesser proportion of resources to be used for transmitting lower priority, less important communications. Thus, the network appliance limits the availability of a protected network's resources for certain senders, packets, messages, communications, paths and/or nodes from which undesired communications are typically received.

Allocation of network resources is controlled by network traffic shaping, e.g. TCP or IP traffic shaping and/or queueing, and/or connection shaping, e.g. by restricting bandwidth, controlling building/assignment of connections and/or other parameters of communications. Since shaping generally provides for control of the rate at which packets/communications can be sent from spammers' networks, it provides the network appliance a means to directly address the theft and abuse of IT resources by controlling the amount of spam, etc. that reaches the protected network. In addition to the direct benefit of such control, the network appliance also disrupts the spammers' economic model because it severely limits the rate at which packets can be sent from spammers' networks to protected networks. This makes the protected networks economically unviable targets, and results in the spammer's cease of attempts to send such communications to protected networks.

Network Overview

The present invention is applicable for controlling a broad range of network communications, including instant messages (IM), SMS/cellular telephone messages, and any smaller, discrete portions of such messages, e.g. packets. It is discussed below, without limitation, in the context of e-mail messages, and thus reference is made to the SMTP protocol, TCP and IP packets, and concepts relating specifically thereto. However, it will be understood by those skilled in the art that the concepts within the scope of the present invention and equally applicable in other contexts, to other protocols and transactions, and to other network communications.

Referring now to FIG. 1, the present invention may be understood with reference to the exemplary, simplified network environment 10. The exemplary network environment 10 includes external MTAs 22, 24 capable of communicating, e.g. via SMTP in a TCP/IP environment, with a protected subnetwork 50 via the Internet/communications network 30. The communications network 30 includes a plurality of intermediate MTAs 40. As well known in the art, an MTA is a mail transport agent, mail server, mail router or an Internet mailer that receives incoming e-mail from local users (within the same domain) and remote senders and forwards outgoing e-mail for delivery. It will be understood by those skilled in the art that an actual network topology may include numerous nodes, clients, servers, routers and/or other MTAs. Optionally, numerous network appliances may be incorporated throughout the network 10, as discussed in greater detail below.

In the exemplary network of FIG. 1, the protected network 50 includes a network appliance 100 that is specially configured in accordance with the present invention, as discussed in further detail below. The network appliance 100 is preferably logically positioned at the edge of the protected network 50, between the external network(s)/MTAs, 30, 22, 24 and the internal mail server/MTAs 60/spam, anti-virus and content filters 70, 80, 90, as shown in FIG. 1. Accordingly, the network appliance 100 is installed in front of a host's MTA(s). SMTP traffic is then routed to the network appliance 100, and the network appliance routes SMTP traffic through to the host's MTA(s).

It should be noted that all hardware and software of the network 10 can be implemented and used in a conventional manner, with the exception of the network appliance 100. Straightforward configuration of conventional hardware and software may be required to configure the network 10 and/or subnetwork 50 to route all communications inbound to the protected network through the network appliance 100.

Network Appliance

Optional implementation of the network appliance 100 as a specially configured router (operating at layer 3 of the OSI model) is advantageous in that any existing SMTP/mail servers/MTAs do not require any modifications. In the SMTP context, the network appliance 100 acts as a network gateway between the Internet (external) and existing SMTP infrastructure. In this "Routed Mode," the network appliance routes traffic between two or more separate routed subnetworks. In this mode, gateways and routes must typically be changed both upstream and downstream of the network appliance. This mode is recommended where the complexity of the protected network precludes bridging, and where the flexibility to perform such optional behaviors as routing email traffic to separate clusters based on class of service or spam level is required. In this mode, the network appliance 100 is visible/detectable only at layer 3 and below in the OSI model, and is transparent to layers 4 and above.

In contrast to a traditional SMTP proxy, the network appliance 100 may optionally operate as a "bump on the wire", operating at a packet level, and not at an application level as is typical of traditional solutions. In this "bridging mode", the network appliance operates at layer 2 of the OSI model, and bridges traffic/moves packets between parts of the same routed subnetwork. In this mode, no changes are required to the configuration of any devices upstream or downstream of the network appliance. This mode is recommended where the flexibility and complexity of Routed Mode is not required. In this bridging mode, the network appliance is visible/detectable only at layer 2 and below, and is transparent to layers 3 and above. The network appliance is therefore similar to a network load-balancing device in that it is transparent to other gateways, firewalls, and load balancers of the network.

As referred to above, the network appliance 100 is specially configured to control the use of the protected network's resources through control of a sender's access to such resources. In accordance with the present invention, the network appliance controls use of the resources of its associated network by limiting the amount of network traffic per unit of time that may pass through the network appliance 100 and into the protected network 50. The network appliance 100 implements network resource controls to allocate resources, on a path-by-path basis, on the basis of path-specific conclusions/information, to incoming network communications in a manner that selectively restricts or augments a permissible flow and/or rate of flow, of communications from a given network path/node, through the network appliance 100 and/or into the protected network 50.

Typically, at the TCP level, and the IP level, network communications, namely packets, are indistinguishable with respect to network resources that they are permitted to consume. In other words, a normal router or switch will forward packets at the fastest possible speed regardless of the packet's content or origin. The network appliance 100, however, allows packet level communications to be shaped, i.e. to permit them to be controlled according to desired parameters, e.g. packet size, number of packets, etc., such that they are transmitted in a controlled, limited way, rather than in the fastest possible way, in order to limit network resources consumption/use in transmission of such packets, and to do so selectively so that some packets are delivered using a greater portion of available network resources, and some are delivered using a lesser portion. In particular, in the SMTP context involving TCP/IP network communications, the network appliance 100 uses TCP/IP traffic shaping techniques to shape traffic flow based on various 'path' characteristics of TCP and/or IP packets of SMTP messages or other network communication protocol transactions. Further, the network appliance 100 may also use connection shaping techniques that control and/or limit the connection concurrency, connection frequency, a total number of permitted connections, a total number of permitted connections per class of connection/communication, a maximum number of messages per connection, etc. For example, using connection shaping, a request for a connection may be denied if building the connection would cause a violation of a limit on the total number of concurrent connections, or building of that connection may be delayed until it can be built without violating the limit. Accordingly, these shaping techniques are used to limit the amount of network resources permitted to be used by incoming communications.

The amount of network resources permitted or use by each network path may be varied as desired, e.g. to provide for less network resource utilization by TCP packets, IP packets, or other network communications arriving on a certain network path, or having a certain characteristic, and to provide for more network resource utilization for another network path. For example, this may be used to limit network utilization by a known spam sender (as determined by the network path of the sender's communications) to 1% of network resources while permitting a known sender of legitimate communications to use up to 10% of network resources, and an important sender to use all presently available resources.

Method Overview

Figure 4:
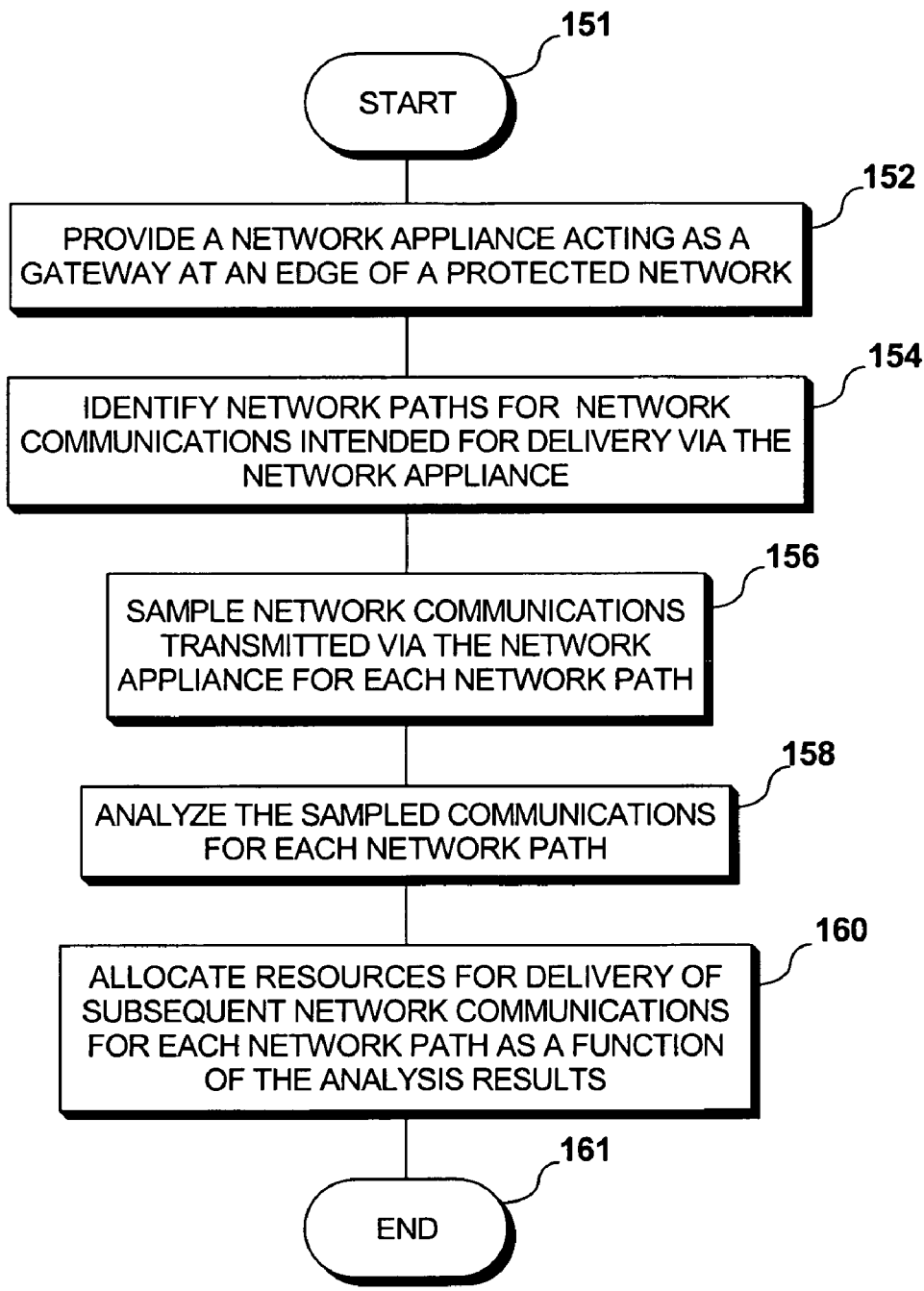
FIG. 4 is a flow diagram illustrating an overview of exemplary method for controlling distribution of e-mail messages according to the present invention.

Referring now to FIG. 4, a flow diagram 150 is shown illustrating an exemplary method for controlling distribution of e-mail messages according to the present invention. This flow diagram 150 provides an overview of the inventive method. As shown in FIG. 4, the method starts providing a network appliance 100 acting as a gateway, i.e. receiving incoming communications, at an edge of a protected network 50 (see FIG. 1), as shown at steps 151, 152.

Next, network paths are identified for network communications intended for delivery via the network appliance and/or into the protected network 50, as shown at step 154. In the SMTP context, such network communications may include e-mail or other messages, and any components thereof, such as TCP and/or IP packets. Preferably, each discrete packet is treated as a separate network communication. By way of example, a network path for a packet may be identified by examining information from the packet header, e.g. to identify an IP source address. Various network path related information may be derived or otherwise obtained from such IP source address, such as information identifying a sending or intermediary (e.g. ISP) system, a sub-network of a sending or intermediary system, a domain name of a sending or intermediary system, or other network path information, or application path information such as network path information of systems previously processing and/or routing the message, sender identity domain or other information typically carried by an e-mail header (e.g., SMTP header information such as TO, FROM, SUBJECT, DATE, mail agent, "received" history, etc.), or other geographic origin (as determined by known techniques.

Further, a network path for a particular packet may be identified in ways alternative to examination of packet headers. These alternative ways include analysis of network blocks (such as Classless Internet Domain Routing ("CIDR") blocks) information, assigned network address block (ASN blocks assigned by IANA) information, physical packet sources determined by techniques such as ICMP or TCP tracerouting, or BGP route investigation techniques.

These techniques are all effective to identify a source, geographic origin, path, or a part of a network path, that has been traveled by a particular packet, and thus may form the basis for a conclusion about other packets traveling the same network path or same part of a network path. Use of network path information, or other techniques allowing for determination of the actual physical source of packets, in identifying undesirable communications is particularly effective because it is very difficult for the spammer to change without a significant amount of extra effort and/or expense. Thus the network appliance 100 is resistant to polymorphic spam (which varies content/sender/recipient information) and other message-related attributes that can be controlled by the spammer.

Next, network communications transmitted via the network appliance 100, e.g. packets, are sampled for each network path, as shown at step 156 in FIG. 4. The goal of the sampling is to obtain a group of samples, for a given network path, that are somewhat representative of network traffic on that path, such that analysis of the sampled traffic leads to a conclusion that is applicable to all traffic arriving along that path with an acceptable level of confidence. Any suitable sampling methodology or technique may be used. An exemplary sampling process is discussed below with reference to FIG. 5. It should be appreciated that steps 154 and 156 are shown as logically distinct for illustrative purposes, but that packets, paths, and sampling occurs repeatedly and/or concurrently, for various paths. Collectively, these steps represent identifying a corresponding network path for a plurality of packets arriving and/or transmitted by the network appliance 100, and sampling a subset of those packets.

Figure 6:
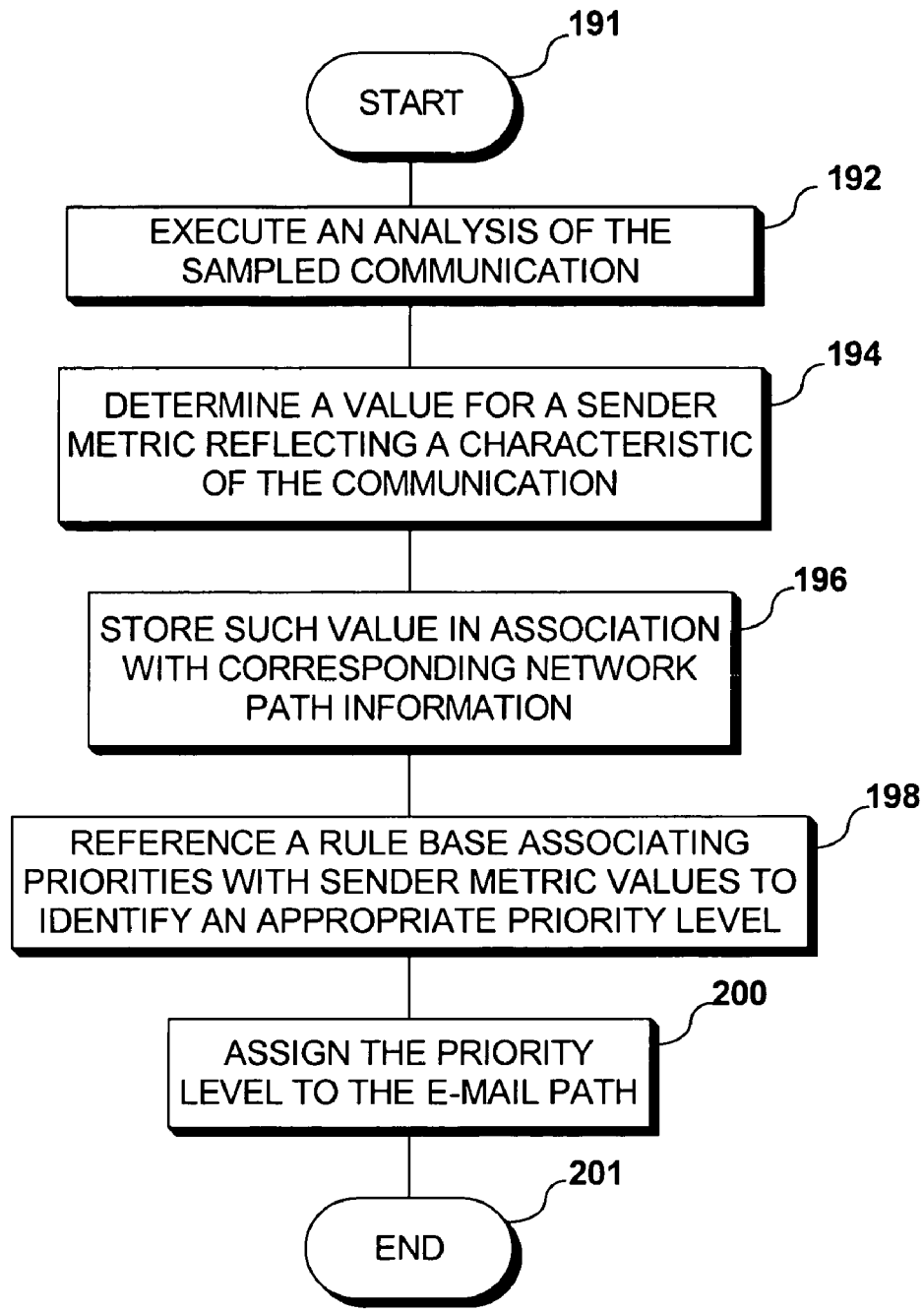
FIG. 6 is a flow diagram illustrating an exemplary method for performing analysis in accordance with the method of FIG. 4.

The network appliance 100 then analyzes the sampled communications, e.g. packets and/or discrete messages they represent, for each network path, as shown at step 158. The goal of the analysis is to reach a result that is effectively a useful conclusion about network communications arriving on the network path. In other words, the conclusion gives some indication whether communications arriving on that network path are desirable, or likely desirable, to the recipient(s). The conclusion may be the result of a certain known process or methodology, or may include post-processing application of logic in accordance with the present invention, e.g. to assign a characteristic representative of a priority level for a communication received along the path. Various techniques exist for performing such analyses and any suitable analysis technique may be used. A detailed discussion of an exemplary analysis process is provided below with reference to FIG. 6.

In accordance with the present invention, the network appliance 100 next allocates resources for the delivery of subsequent network communications for each network path as a function of the analysis results, as shown at step 160. The goal of this allocation is to control the amount of resources permitted to be used by various senders and/or network paths used by such senders. Accordingly, after analysis results have been obtained and/or conclusions have been drawn about a path, the method involves controlling network resources by allocating resources for delivery of subsequent communications as a function of the analysis' results, for each path. For example, if a conclusion drawn from an analysis indicates that a certain path tends to deliver a large proportion of spam or other undesirable messages, control may be exercised to limit to a low level any network resources that may be used to deliver communications received on that network path. More specifically, results/conclusions drawn from such path-based analysis are subsequently used to determine how much of the network's resources will be allocated to permit passage of packets/communications arriving on the same or a similar path/from the same node. The conclusions may be used to establish preferences that will cause the network appliance to limit the amount of network resources used for certain packets, etc. arriving via certain network paths. For example, there may be a limit of the permissible amount of network resources that prevents transmission of additional packets arriving via a certain network path if doing so would cause utilization of network resources for that network path to exceed a predetermined threshold.

Various techniques may be used to control, i.e. selectively limit, allocation of network resources for transmission of communications through the network appliance 100 and/or into the protected network. In a preferred embodiment, TCP and/or IP traffic shaping is employed, as discussed below with reference to FIG. 7. In addition to TCP/IP traffic shaping, the system may shape other aspects of the communications. For example, for SMTP e-mail, the network appliance may use connection shaping by controlling/limiting the number of concurrent connections (e.g. to deny/delay building of a new connection if it would exceed the number of concurrent connections), a connection frequency, a total number of connections, a number of connections per class of connection or sender, a number of messages that may be transmitted via a given connection/session (connection limiting) and/or other rate control parameters. For example, connections that attempt to complete too many transactions (as determined by an established limit) during a single connection (as judged by the path's priority level) can be terminated by assigning a special firewall mark to that connection that will trigger severing of both ends of the forwarded connection via the TCP RST packet method discussed herein. These exemplary techniques can be used to limit bandwidth accessible for delivery of communications, and these parameters are used herein to limit traffic arriving on selected paths. Further, a queueing method may be used to control use of resources, e.g. to queue packets/messages/communications, etc. and then to selectively dequeue such communications by transmitting or dropping/deleting such communications, to enforce a predetermined transmission rate, resource limit, etc. Such queueing eventually impacts the sending server, or an intermediary device, and forces such server, etc. to lower its transmission rate to accommodate the enforced dequeueing rate. Accordingly, it can be seen that various policing techniques may be used to control/limit resource allocation in accordance with the present invention. By way of further example, packets may otherwise be acknowledged more slowly than necessary, may be artificially delayed, or may be dropped in response to overlimit connections, thereby forcing retransmission of the dropped packets.

No matter the mechanism of control, recipient-controlled transmission parameters are selectively manipulated to cause network communications from a certain network path to selectively flow more freely into the protected network, thereby consuming relatively more network resources, or to selectively flow in a more restricted manner into the protected network, thereby consuming relatively less of the recipient's network resources. Established resource limits may be relative in nature, or absolute in nature. All of these techniques directly limit the effective transmission rate/throughput for a given senders/network path's communications, according to the preferences of the network administrator, etc.

Network Resource Control

Figure 7:
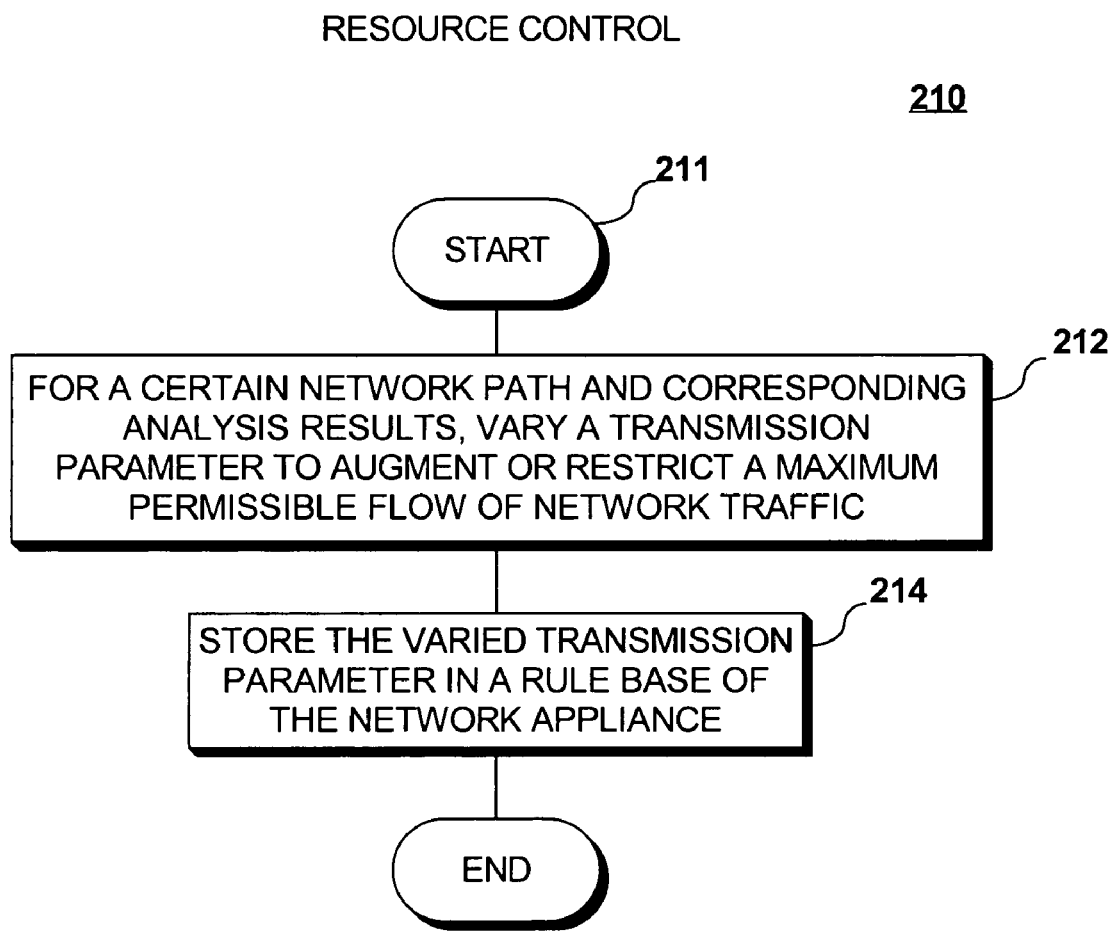
FIG. 7 is a flow diagram illustrating an exemplary method for performing controlling network resource allocation in accordance with the method of FIG. 4.

A more detailed discussion of an exemplary resource control/allocation process is provided below with reference to FIG. 7. In this embodiment, the network appliance 100 uses TCP and IP traffic shaping and thus operates at network layers 4 and 3 of the OSI seven layer model, where the TCP and IP protocols operate, these layers and associated transmission parameters being recipient controlled. This is contrary to most anti-spam systems, which operate at network layers 5 to 7, where SMTP operates, SMTP being sender controlled. More particularly, the network appliance 100 provides dynamic, IP-level (OSI model, Network layer, layer 3) and/or TCP level (OSI model, Transport layer, layer 4) network traffic shaping based on sampling and analysis of network communications, such as SMTP messages, at the packet level.

By way of example, such TCP traffic shaping involves manipulation of the TCP receive window size, Maximum Segment Size (MSS). Reducing the TCP receive window size, or reducing the MSS for transmission of packets into the protected network will directly cause such packets to utilize less network resources and to be received more slowly at recipients in the protected network. By way of further example, IP traffic shaping may involve a policing technique that sets absolute limits on transmission rates, packet volumes, etc. This may involve queueing packets for transmission to a protected network, and dequeueing those packets at a rate that gives effect to established limits, rates, packet volumes, etc. Such TCP traffic shaping effectively forces the sender/sender's messaging system to change, e.g. decrease, its transmission rate. Such IP traffic shaping sets firm resource limits for transmission of the sender's communications.

Figure 2:
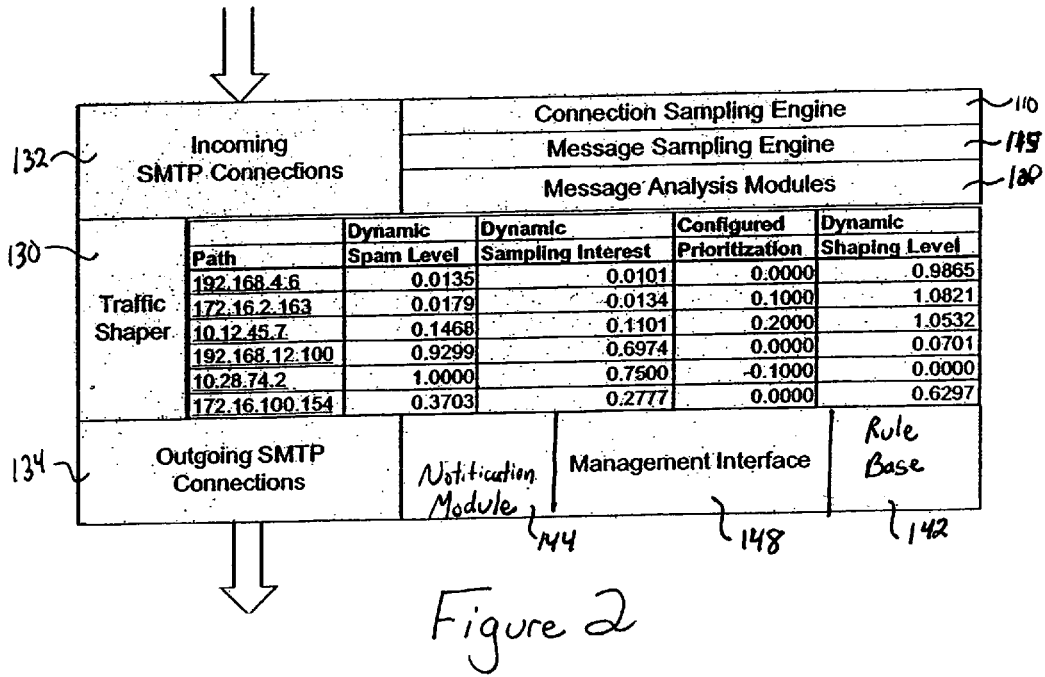
FIG. 2 is a block diagram illustrating logical components of the network device of FIG. 1.

By way of example, consider a network appliance 100 (FIG. 1) receiving network traffic on six different network paths (see Path 1 and Path 2, FIG. 1), as shown for illustrative purposes in FIG. 2. The network appliance 100 includes several logical components, including a Connection Processor including an Incoming Connection Processor 132 and an Outgoing Connection Processor 134, and a Connection Sampling Engine 110. The Incoming Connection Processor 132 receives all requests for building of SMTP connections. The Incoming Connection Processor 132 therefore receives incoming connections for delivery of network communications and calls other components of the network appliance 100 as necessary. However, in accordance with the present invention, the requested connection is not automatically granted, and/or additional logic is applied in determining whether/when/how to build the requested connection. After that logic is applied, as discussed below, the Outgoing Connection Processor 134 manages the appropriate connection. The Outgoing Connection Processor 134 therefore creates network connections as necessary to deliver communications at the appropriate time, e.g. after the prescribed delay, to deliver communications in accordance with the prioritization techniques described herein. The delaying and/or eventual delivery of communications is thereby performed by the connection processors 132, 134 of the network appliance 100. The connection processors 132, 134 may be implemented with software using network architecture layer 3 and/or 4 switching and/or load balancing techniques that are well known in the art. Modification of such techniques to provide for delayed delivery, etc. in accordance with the present invention is straightforward, as will be appreciated by those skilled in the art.

The network appliance 100 includes a Message Sampling Engine 115, which is configured to provide the sampling referenced above, and discussed in further detail below. The network appliance further includes a Message Analysis Modules 120, which is configured to provide the analysis referenced above, and discussed in further detail below. By way of example, consider that the Message Sampling Engine 115 and the Message Analysis Modules 120 cooperate to determine that Path 1 (identified by the numerical IP address 192.168.4.6 in FIG. 2) has a spam level of 0.0135 (which is a value representative of the amount of spam determined to arrive via that network path, the value being calculable in any suitable manner), has a configured prioritization of 0.000 (meaning there is no manual/forced overriding and/or weighting of calculated analysis results/values, e.g. using a whitelisting or blacklisting technique), and that the Dynamic Shaping Level is 0.9865 (which is a value representative of an amount of resources that should be allocated to the corresponding path, the value being absolute or relative in nature, and being calculable in any suitable manner). Such whitelisting and blacklisting parameters may be varied via the Management Interface 148, as discussed below.

Accordingly, the Connection Sampling Engine 110, Message Sampling Engine 115, and Message Analysis Modules 120 cooperate to determine preferred levels and/or priorities and/or conclusions about network paths that may be used to determine how to regulate traffic flow through the network appliance, e.g. for which paths to augment flow, for which paths to restrict flow, and by how much. Exemplary data is reflected in tabular form in FIG. 2. Information indicating traffic shaping levels, paths, whitelist information (e.g., identification of addresses or senders for which a high level, or all resources, should be allowed), blacklist information (e.g. identification of addresses or senders for which a low level, or no resources, should be allowed), preferences, and the like may be stored in the network appliances' Rule Base 142.

Optionally, the Message Sampling Engine 115 tracks data and varies a rate of sampling as a function of the results of analysis, as discussed below. A Dynamic Sampling Interest may be calculated, as shown in FIG. 2, to reflect a greater or lesser amount of data that may be sampled to for analysis/conclusion purposes, as discussed in greater detail below.

The network appliance 100 further includes a Traffic Shaper 130, which determines whether to grant the requested connection. This module operates at the at the network level, within the network stack, and inspects packets before determining whether a connection will be allowed. Criteria for granting a connection include, but are not limited to, whether a current number of concurrent connections sustained has reached a limit, the priority of the path requesting the connection, whether a number of existing connections from that same path (both on the same network appliance and others in the same logical cluster) has reached a limit, the current load on the network appliance and the host MTA(s), how recently the network appliance or network appliance cluster has seen connections from this requesting path in the past, whether this requesting path has been manually prioritized higher or lower (e.g. it appears on a whitelist or blacklist), etc.

If the connection is accepted, the Connection Sampling Engine 110 assigns the connection a firewall mark that is data providing a unique identifier for the connection. Further, depending upon what the firewall mark is, the firewall mark indicates to other subsystems the proper resource allocation allowed for the connection. The original packet is then allowed egress from the network appliance to the host MTA(s). If the connection is not accepted, it will be rejected via a standard method, such as the return of an ICMP port unreachable packet or a TCP RST packet, or it may be dropped without any reply packet(s), and it will not receive a firewall mark.

Accordingly, the Traffic Shaper module 130, controls allocation of resources such that to limit the amount of network resources used for transmission of sender's communications. By way of further example, Path 2 (identified by numerical IP address 10.28.74.2 in FIG. 2), is determined to have a spam level of 1.00, meaning, for example, that 100% of the communications arriving at the network appliance along path 2 have been determined to be undesirable spam communications. Accordingly, the shaping level is determined to be 0 (for example, as calculated as 1−(spam level)), meaning that very little, or optionally no, resources may be used. Accordingly, Path 2 communications are given a very low priority, and will not be permitted to use much of the protected network resources. Accordingly, the Traffic Shaper 130 controls/restricts an allocation of resources as a function of, e.g. in proportion to, the assigned spam level. The Traffic Shaper 130 uses the levels determined by the analyses to proportionally control the network resources available for use to delivery/process communications arriving along each of these paths, e.g. to assign proportionate shares of units of network resources.

As SMTP traffic travels out of the network appliance, the Traffic Shaper 130 will consult the firewall mark applied to each connection and limit the speed of the connection's progress in conjunction with the priority level indicated by the firewall mark. The Traffic Shaper 130 may limit the rate of a connection via any of appropriate method, including creating artificial delays by holding packets without releasing them for a certain amount of time, dropping packets in response to overlimit connections, forcing a retransmit of the dropped packets, acknowledging packets slower than would otherwise be possible and/or TCP receive window and MSS (Maximum Segment Size) manipulation.

Figure 3:
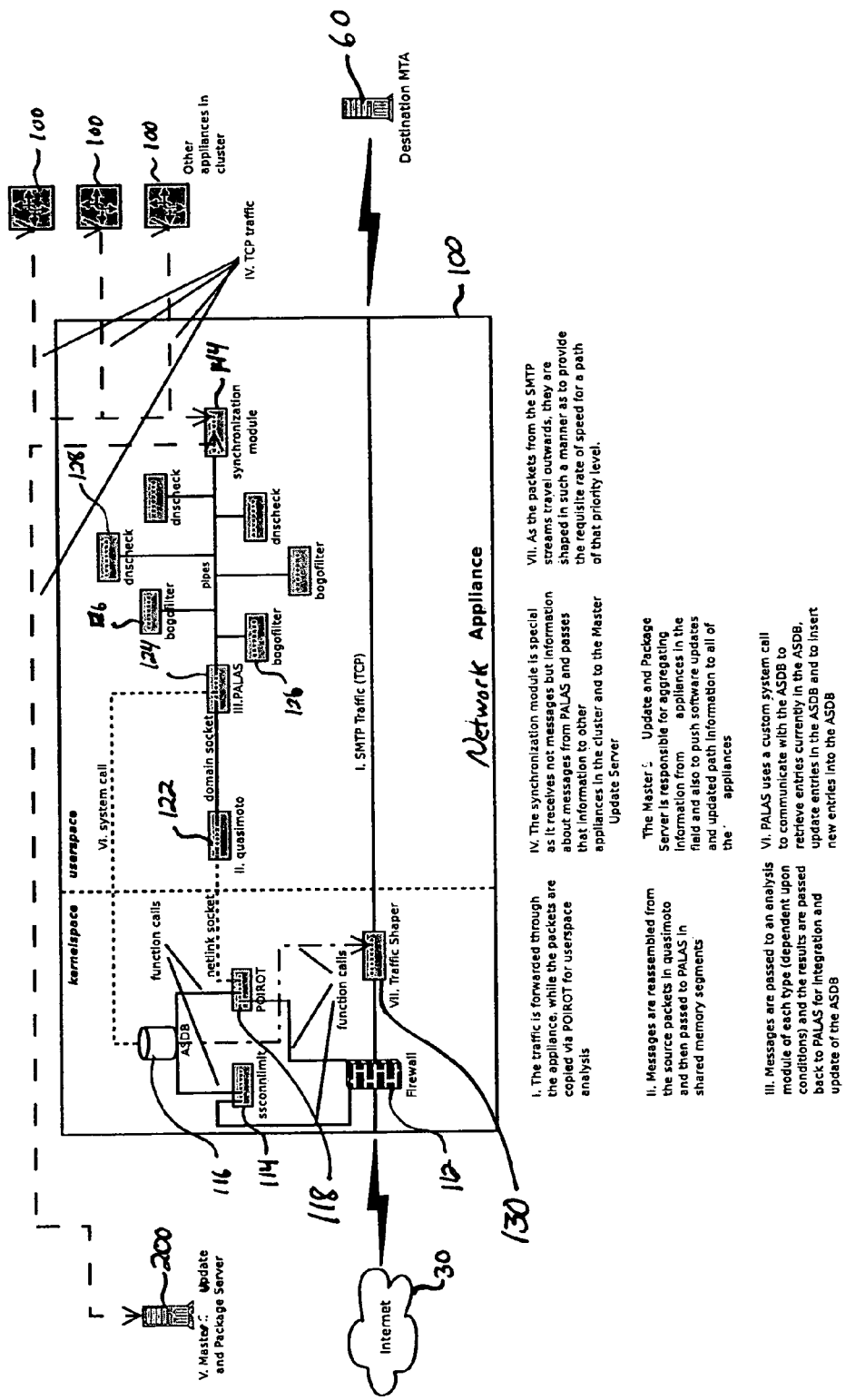
FIG. 3 is a block diagram further illustrating logical components of the network device of FIG. 1.

By way of additional discussion of the network appliance of FIGS. 2 and 3, the network appliance 100 (or, interchangeably throughout this description, a cluster of network appliances) integrates into the network between the Internet and the Destination MTA(s) 60 at OSI layer 2 (transparent bridging mode) or layer 3 (routing mode).

In transparent bridging mode, the network appliance 100 is network transparent, and processes packets in the course of bridging them from the external (Internet) network 30 to the protected (Destination MTA) network 50. In routing mode, the network appliance 100 is visible as a router between the external and protected networks, but its impact remains confined to the IP and TCP layers.

In either mode, each packet (or, with use of policy routing in certain configurations, each SMTP packet) from the external network 30 destined for the protected network 50 (and vice versa) must pass through the network appliance 100.

The packets from the Internet enter the network appliance 100 and, once passed through the Ethernet driver, reach the firewall layer 112 (FIG. 3) in the network subsystem (see Incoming SMTP Connections 132, FIG. 2). The firewall layer 112 manages the flow of packets through much of the system.

For each new SMTP connection, a 'SYN' packet is the first to reach the network appliance 100. The ssconnlimit subsystem 114 (FIG. 3), or Connection Sampling Engine 110 (FIG. 2), processes these packets, and performs several operations. For example, the ssconnlimit subsystem 114 determines the behavioral history and corresponding classification ("bucket") for the connecting network path by querying the ASDB subsystem 116 of FIG. 3. In this regard, the ASDB subsystem 116 additionally determines whether to allow an additional connection from the class of network path. For allowed connections, a 'mark' (also known as a firewall mark) is assigned for tracking of the connection within the network subsystem. Further, the ssconnlimit subsystem 114 determines whether to allow the connection based on connection concurrency and connection frequency.

Once the ssconnlimit subsystem 114 has approved a new connection, all packets from that connection are passed to a subsystem referred to as POIROT 118, FIG. 3. This is analogous to the Message Sampling Engine 115 of FIG. 2. The POIROT subsystem 118 processes these packets and performs several operations, namely: passively observing and tracking SMTP protocol conversations; queries the ASDB subsystem 116 to determine the sampling interest and maximum allowable messages per connection for the network path, and determining whether to sample a given message on the connection based on that sampling interest and a global sampling modifier; copying packets and transmitting the copies via a netlink socket to another subsystem, labeled quasimoto 122 FIG. 3 (analogous to the Message Analysis Modules 120 of FIG. 2) up to the defined maximum sampling length for a sampled message; enforcing any messages per connection limit by marking for termination any connections that exceed that limit; and querying the ASDB subsystem 116 at the start of any new SMTP, etc. message transaction in order to update the 'mark' and sampling interest for the connection based on any changes in the ASDB record for that network path.

All packets then leave the POIROT subsystem 118, and are passed to the Traffic Shaper 130 (FIGS. 2, 3). In this example, the Traffic Shaper 130 applies TCP traffic shaping to enforce the bandwidth allocated to the classification of each network path, e.g. as recorded in the Rule Base 142 of FIG. 2. Rates and bandwidth allocation are enforced by such techniques as: packet queueing, in which packets are queued for each network path, and dequeued for transmission on the protected network at the enforced rate. Packets received in excess of queue lengths are dropped. This robust technique forces mandatory changes in the behavior of remote systems, forcing them to place packets on the wire at the permitted rate. Allocations may also be enforced by TCP sliding window control, whereby changes in the size of the sliding window limit the number of packets that can be in transit between the transmitting system and the receiving system, and maximum segment size control, whereby changes in the size of the maximum segment that can be transmitted limits the data that can be transmitted.

By way of further example, the Traffic Shaper 130 may allocate a full or generous allotment of network resources for processing communications arriving on path A, and allocate a small fraction of network resources for processing communications arriving on path B. Additionally, a sampling rate may be reduced for path A and increased for path B. Resources may be allocated, e.g. on a percentage basis, on an all available basis, etc., in any suitable manner.

The packets leaving the Traffic Shaper 130 are then are passed to the Ethernet driver for transmission on the protected network physical media, as best represented by Outgoing SMTP Connections 134 in FIG. 2.

Though the production packet has been transmitted by this point, the temporary copy made by the POIROT subsystem 118 has been handed to the quasimoto system 122 (in userspace) for additional processing.

The quasimoto subsystem 122 receives these packets via the netlink socket communication, and stores them for reassembly. The quasimoto subsystem 122 reassembles packets into complete SMTP message transactions, which are placed in shared memory segments. The quasimoto subsystem 122 then notifies the PALAS subsystem 124 (FIG. 3), which is analogous to the Message Analysis Modules 120 of FIG. 2, for each shared memory segment.

The PALAS subsystem 124 is the process responsible for coordinating all of the analysis of sampled data and conclusions drawn about network paths. PALAS assigns shared memory segments to various independent analysis modules, such as bogofilter 126, and dnscheck 128 of FIG. 3 (which are illustrative of the Message Analysis Modules 120 of FIG. 2) for processing, assigning further analysis based on results as necessary, and then compiles all results into a conclusion about the sending network path. Conclusions are communicated to the rest of the system through updates to the data stored for each network path in the ASDB database 116. By way of further example, bogofilter 126 is a Bayesian analyzer that calculates the statistical likelihood that message content is spam or legitimate email based on a comprehensive statistical analysis of large amounts of both types of messages, and dnscheck 128 is a domain name system (dns) query analyzer designed to query outside data sources about the status of network paths.

Additional types of modules are also handled by PALAS, including the synchronization/notification module 144, FIGS. 2, 3. The synchronization/notification module 144 is responsible for sharing information about observed behavior and behavioral conclusions with cluster peers (network appliances) and with the Master Update Server 200. This module 144 also receives updates from cluster peers and the Master Update Server 200.

The system provides a web-based management interface management interface 148 (FIG. 2) for control of operation, querying and modification of ASDB data, and viewing of statistics, performance data, operational data and reports.

In one embodiment, any connections not having a firewall mark are not passed through the Traffic Shaper 130. Instead, these packets are forwarded without application of any control mechanism. This is to ensure that non-SMTP traffic is not adversely affected by the network appliance. In other embodiments, non-SMTP traffic is also passed through the Traffic Shaper 130 and is subject to control, as described above.

In one embodiment, any connection refusal is not reported back to the originator as "host not available" or some other message that makes the recipient's ISP seem technically in error (e.g., system is down). Due to the workings of SMTP (mail protocol), the slowing and/or temporary stopping of connections will not be reported for a predetermined time period, typically four hours. Accordingly, the existing robustness capabilities of SMTP, e.g., those ensuring delivery, etc., are exploited for the purposes of the present invention.

In a certain embodiment, unless otherwise indicated, all communications from a given sender, domain or network path are assigned a predetermined default priority, and are assigned resources accordingly. This default level can be particularly useful when it is based on analyses performed by other network devices, or when an adequate amount of data from analyses has not yet been gathered by a particular network appliance. For example, such resource allocation may be implemented by a network administrator's input via the management interface, e.g. to whitelist a network path or sender to permit a large allocation of resources or to blacklist a network path or sender to permit only a small allocation of resources. Such resource allocation can be implemented using the configured prioritization parameters illustrated in FIG. 2. By way of example, such analysis-independent configured prioritizations may be based on prior analyses from another network appliance, information gathered from other parties apart from use of any network appliance, a probability based determination based on observations of other paths (e.g. for other senders/network paths in a same CIDR or ASN block), etc. Alternatively, other information typically carried by a communication, or associated with such a communication, is used in an inventive way in accordance with the present invention to identify a priority level for use in traffic shaping.

Optionally, the method may include a synchronization/notification feature, as shown at step 162 of FIG. 3, and as shown in module 144 of FIG. 2. In such an embodiment analyses, conclusions, resource control parameters, etc. are communicated from one network appliance to one or more other network appliances, within or outside of the protected network, and/or to a centralized system established to collect and/or distribute such data from network appliances. In this manner, a restriction on resources for a certain network path may be implemented at various nodes throughout a network, on one or more distinct network paths, thus resulting in resource savings in a greater portion of the overall network. Such synchronization/notification is discussed in greater detail below.

Sampling

Referring now to FIG. 4, a flow diagram 170 of an exemplary sampling process is provided. It should be noted that this example is discussed in the context of an SMTP transaction, although it is equally applicable to any network communication protocol transaction. As shown in FIG. 4, the sampling process starts with determining whether an SMTP transaction has begun, as shown at steps 171 and 172. In the SMTP context, this involves receipt at the Incoming Connections Processor 132 (FIG. 2) of the network appliance 100 of one or more SYN packets, which indicate an SMTP connection request according to the TCP protocol. In this mode, a connection is granted when requested. In another mode, after sampling has occurred and data has been gathered, a connection may not be granted when requested, or may be granted only if certain conditions are met, etc., as discussed below with respect to resource allocation.

If no transactions have begun, there are no transactions to sample, and thus the system remains in a waiting state, as shown at step 172. If an SMTP transaction has begun, then it is next determined whether to sample for the detected SMTP transaction, as shown in steps 174, 176. The detection of a beginning of an SMTP transaction and the determination of whether to sample is performed by another module of the network appliance 100 operating at the firewall level, namely, the Message Sampling Engine 115 shown in FIG. 2.

This determination may be made if a variety of ways. In one embodiment, the network appliance uses a static sampling model to sample SMTP connections for each network path passing through the network appliance, and communications arriving along these connections. By way of example, the sampling rate may be predetermined, or selectively configurable. For example, the sampling rate of communications may be predetermined and static, e.g. 5% of all communications received on the network path. For example, this may be established by the system, system administrator, or recipient via a management interface. The sampling rate may be determined by reference to the system or recipient preference data stored by the network appliance.

Alternatively, determining whether to sample involves evaluation of various criteria. By way of example, criteria for determining whether and/or when to sample include, but are not limited to whether or not the network appliance has prior knowledge for network path associated with the transaction, what is the recorded interest level in sampling transactions from this path (if there is prior knowledge for the path), and global modifiers that affect the sampling interest levels for all paths.

In an alternative embodiment, the sampling model is adaptive in that it varies over time for each path. In such an embodiment, it may be desirable to sample at a default rate, and then to adjust the sampling rate. For example, consider that a recipient has determined that communications received along a certain network path are relatively unimportant to him and so should be delivered at a rate that consumes no more than a fixed percentage of available network resources. The recipient may specify a preference setting the percentage. Accordingly, when an analysis determines that communications are being received at a rate beginning to exceed the preferred percentage, the priority level of communications for that path may be decreased, and the sampling rate may be increased. Sampling at a rate inversely proportional to the determined priority of a given path allows more sampling/monitoring to be devoted to questionable senders or paths, etc. Alternatively, prioritization can be inferred by observing behavior of a recipient and prioritizing according to the observed preferences of the recipient.

Alternatively, for example, the sampling rate may be varied as a function of currently available processing capacity of the network device, or an interest level for each path. The interest level may be determined according to results of analysis performed by various analysis modules. In a preferred embodiment, no communications are blocked, deleted or otherwise rendered undeliverable as a result of such sampling or other processing. Instead, such sampling results are used to influence the overall sampling interest for a given path. As a path is determined to have a higher sampling interest, as determined by the results of an initial sample described above, the sampling process may be dynamically varied to includes a larger representative samples, to enhance the accuracy of any assigned spam level determination. Sampling may continue after initial sampling and analysis for a given path to confirm or modify assigned conclusions, spam levels, etc. Dynamic sampling interest level data may be maintained in a database at the network appliance 100, as shown illustratively in tabular form in FIG. 2.

Referring again to FIG. 4, if it is determined not to sample a particular transaction, then the packets are simply transmitted normally by the network appliance, as shown in FIG. 178. However, such transmission may be subject to resource control constraints already established in accordance with the present invention.

If, however, it is determined that the transaction will be sampled, then all of the TCP and/or IP packets for the detected SMTP transaction are copied as they arrive at the network appliance, and the copies are stored, as shown in step 180. The original packet is then transmitted normally. Storing a copy, and subsequently analyzing the copy, while the original packet is transmitted, allows the packets to proceed without delay. If delay is desired, the network appliance may be configured to examine the original packets without making copies.

In this embodiment, the copied packets are then reassembled into a contiguous transaction record, as shown at step 182, and the sampling method ends, as shown at step 183. Reassembly into a contiguous transaction record is performed by the Message Analysis Modules 120 of the network appliance of FIG. 2 (or the quasimoto subsystem 122 of FIG. 3). More particularly, the copied packets are passed to the Message Analysis Modules 120 via sockets. Once the SMTP transaction is complete and before another one begins, the Message Analysis Modules 120 will pass a special packet (referred to as a sentinel packet) to the Message Analysis Modules 120 (reassembly process) to indicate the transaction's completion.

The reassembly process reassembles the copied packets sent to it from the firewall module into complete, ordered SMTP transactions. It will receive copied packets from the socket(s) assigned for this task and only attempt reassembly for a particular transaction once it has received a sentinel packet for that particular transaction. Once a sentinel has been received, the reassembly process will inspect all of the packets for a particular transaction and attempt to reorder and reassemble them according to the order they had originally been received in. The result of this is then placed into a contiguous memory region, referred to as a shared memory segment. The globally unique identifier assigned to the shared memory segment is then passed via socket to the Message Analysis Modules 120, or PALAS 124, etc. for analysis.

Analysis

Figure 5:
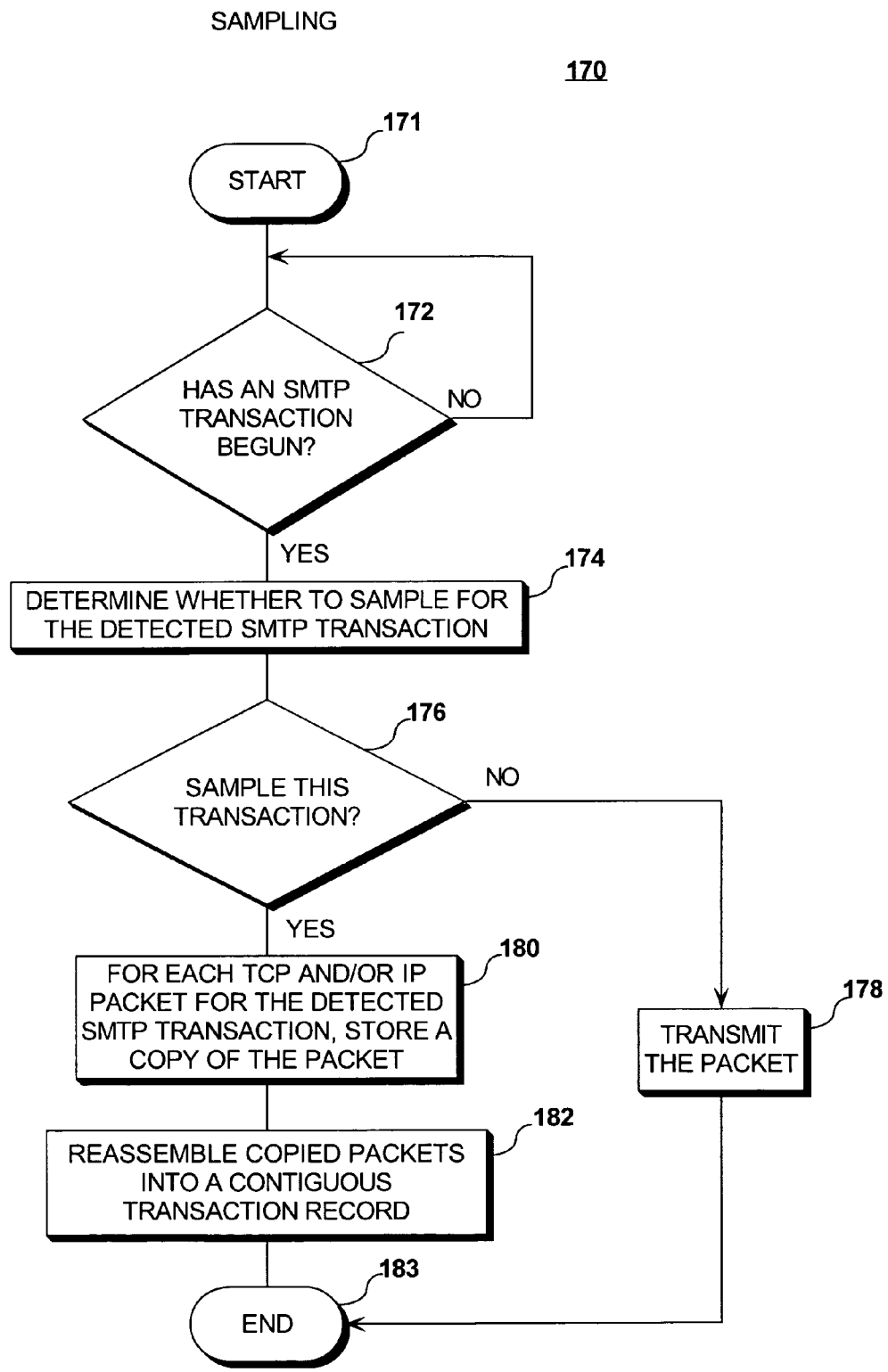
FIG. 5 is a flow diagram illustrating an exemplary method for performing sampling in accordance with the method of FIG. 4.

Referring now to FIG. 5, a flow diagram 190 of an exemplary analysis process is provided. As shown in FIG. 5, the method starts with execution of an analysis of the sampled communication, e.g. the network transaction and/or the associated TCP and/or IP packets, as shown at steps 191 and 192. This analysis is performed by the Message Analysis Modules 120, e.g. PALAS 124 and individual analysis modules such as bogofilter 126 and dnscheck 128, of the network appliance (see FIGS. 2 and 3). In short, the sampled communications are processed by internal analysis modules responsible for determining the probability that a given communication is spam, or otherwise undesirable. Various suitable modules/software are well-known in the art, and any suitable modules/software may be used. Exemplary techniques include text classification, signature analysis, content analysis, and delivery failure rate, Bayesian content analysis, pattern matching (via regular expressions), string matching, query of DNS information about the transaction's path, inclusion of transaction's path/subnetwork on a list of IPs/subnetworks (e.g. a whitelist or blacklist), source route of transaction's path (e.g. obtained via a BGP route investigation), time of day received, content checksum lookup (e.g. DCC, Vipul's Razor), whether the transaction was successful and/or any SMTP-level errors generated during the transaction, whether or not the transaction was an attempted attack on the host MTA(s) or the network appliance (e.g. a dictionary attack, denial of service), presence or absence of valid certification stamp in a transaction, presence or absence of a virus and/or executable content, whether or not the recipients of a transaction are valid and/or existent, etc.

In the context of the exemplary embodiment discussed above, execution of the analysis involves the acceptance of the shared memory segment identifiers from the reassembly process via the socket prescribed for that purpose. It can also accept update and control information from other sources as necessary. Upon receipt of a shared memory segment containing an SMTP transaction, the Message Analysis Modules 120/PALAS 124 will pass the shared memory segment's identifier any number of analysis processes, e.g. bogofilter 126, dnscheck 128, in any order deemed necessary to properly analyze that particular transaction. Reasons for passing or not passing a particular transaction to any particular analysis process include, but are not limited to the amount of behavioral history recorded for the transaction's originating path, the size of the transaction, the results of prior analysis processes regarding this particular transaction, the time of day the transaction was received, the set of client-specified preferences, etc.

As a result of the analysis process, a value for a sender metric is determined, as shown at step 194. For example, sender metrics may include a delivery success rate metric indicating the percentage of communications that are delivered (or undeliverable). For example, this may be achieved by maintaining a hash table of valid addresses in order to determine deliverability of sampled communications, or by proxy processing of e-mail "bounce" messages by the network appliance. It should be noted that this table of processing may be performed dynamically, in real time. Methods and techniques for doing so are straightforward as will be appreciated by those skilled in the art. The rate of undeliverable communications is typically unusually high when the communications are sent using a dictionary attack or brute force spam method because many of the recipient addresses are merely guesses at valid network addresses. Alternatively, a spam rate metric may be determined to indicate the proportion of communications from a certain path that are deemed to be spam, and therefore undesirable. For example, communications may be determined to be spam using content-based analysis, such as pattern matching, as is well known in the art. While this technique may not be completely effective for filtering, it is useful for heuristic analysis. As another alternative, a virus rate metric may be used to reflect the number of communications along a given network path that carry viruses, e.g. using virus-checking software. Any suitable metric and/or value may be used. For example, spam or virus detection software may be used to determine a spam or virus level for mail received on a certain path.

Once all of the analyses are completed, the network appliance 100 aggregates the results and computes a value (representing a priority level) and sampling interest level for a corresponding network path. In the example of FIG. 3, the PALAS 124 provides a runtime configuration of a set of instructions and how to carry out various analysis rules from the rule base 142 of FIG. 2. Such rules may include logic, guidelines, instructions, etc. After the desired analysis or analyses for a certain path is complete, the value(s) representing such a level is stored, as shown at step 196. Such values are stored in association with an identification of that path, as shown by way of example in tabular form in FIG. 2.

In this embodiment, once a value for a given path is determined, a rule base 142 is referenced, as shown at step 198. The rule base 142 stores recipient, system, etc. preferences and rules for delivering communications, and thus associates priorities with sender metric values. For example, the rule base 142 may store a rule indicating that a network path having a delivery success rate of less than 80% shall be assigned a "LOWEST" priority level. By way of further example, such analysis may be used to assign a "spam level" or a "virus level", which is representative of a priority level or other conclusion about how to treat communications arriving on the given path.

Finally, the method ends when the priority level specified in the rule base 142 for the metric having a certain value is assigned the associated priority level specified in the rule base 142, as shown at steps 200 and 201. For example, the network path having a delivery success rate of less than 80% is assigned the "LOWEST" priority level. For example, this may involve storing data associating the network path with the "LOWEST" priority level so that data may be accessed and used by the network appliance 100, namely the connection processor 132, 134, for the delivery of communications in a prioritized manner.

Stated differently, the analysis process identifies characteristic information that may be shared by multiple communications and performs a statistical or other analysis on those communications to determine which communications are likely to be from irresponsible senders or be undesirable, etc. Optionally, the analysis process includes assigning all communications having that shared characteristic information (e.g. a high level of spam messages) a corresponding priority level (e.g., low priority). Accordingly, communications having a shared characteristic are assigned a priority level based on some metric or other shared information. For example, communications delivered from a certain sender along a certain network path may be sampled to determine levels of communications containing viruses, to determine whether the communications are undeliverable (which is often the case when a dictionary attack spam method is used), or whether the communications are spam.

Alternatively, there may not be discrete priority levels. Instead, values for the sender metrics may be used to determine an appropriate allocation of network resources in another manner, e.g. on a percentage basis.

Accordingly, a priority level determined for the network path based on a sample may be applied as the priority level to all incoming communications arriving along that same network path.

In addition to the analysis tools described above, there may be additional behavioral analysis. For example, such analysis may include drawing a conclusion about a network path based on characteristics abuse of SMTP RFC's, abusive connection attempts, time of day of requested connections, detection of multiple IP addresses sending the same communication, bandwidth usage trends, etc.

Synchronization/Notification

In general, a single network appliance on single network path is capable of impacting communications all the way back to the source, e.g. using the TCP traffic shaping techniques described above. It should be noted that intermediaries, such as ISP's, routing nodes, gateways, etc., between the recipient and the sender, and any other nodes outside of the network path between the recipient and the sender, may also have network appliances 100 (or similar software) for carrying out the inventive method.

In one such embodiment, network appliances provided at various nodes on the network communicate with one another to operate in concert. More specifically, once a certain network appliance identifies a network path/sender for which it is desirable to limit network resource utilization, it may communicate such information to other network appliances that are upstream on that network path, or that are on other network paths. This may be repeated at other network appliances, thereby limiting the use of network resources within other networks. This implementation at various nodes has the advantageous effect of pushing the burden of handling/processing/transmitting such undesirable communications toward and/or to the sender/sender's network, while relieving multiple downstream networks of associated communication handling/processing burdens In such embodiments, the network appliance 100 of a recipient may be provided with a synchronization/notification module 144, and an intermediary or other ISP may be provided with a network appliance configured to receive communications from the synchronization/notification module 144. Accordingly, when the network appliance 100 at the recipient determines to hold communications from a certain network path, etc., the synchronization/notification module 144 notifies an intermediary or other node, such as the recipient's ISP, of this preference. The recipient's preference may then be stored in the intermediary/other node's network appliance's rule/logic storing database 142. Accordingly, the intermediary/other node may begin rejecting, or delaying, communications that the recipient does not wish to receive. This may be repeated for other nodes throughout the network. Repeating of this process further pushes the burden of low-priority communications back to the sender, thereby reducing or eliminating burdens on network/system resources of the recipient and all intermediaries between the recipient and the sender. This is particularly useful to push the burden of spam communications back to the systems of the spam senders. This can create a spam "squelch" at the source of the spam communications, thereby reducing burdens on multiple communications networks and systems.

It is emphasized that such notifications may be broadcasted to any other party, not just upstream parties. Accordingly, information from one party, e.g. ISP, may be shared with another party, e.g. another ISP. For example, this information sharing allows the second ISP to lower priority of communications arriving along a certain network path before any such communications are received by using information learned by the first ISP that communications received along that certain network path are undesirable, or should be treated with a lower priority, e.g. because of an irresponsible sender. This is advantageous for conserving ISP network resources. In effect, this allows for creation of a list of "blacklisted" senders, communication paths, etc. that may be shared with other parties that have network appliances and operate in accordance with the present invention.

A network based master update service may be provided that will aggregate path information from a plurality of network appliances currently in service, in an effort to mitigate distributed e-mail-based attacks. In such an embodiment, various network appliances are provided with the ability to send information about paths back to a master server that aggregates the information and communicates it back to multiple network appliances. The master server is then used to synchronize network appliances across the network, e.g. by communicating corresponding data to various network appliances, so that they all know about all paths seen across all network appliances in near real-time and to thereby prevent an attacker or spammer from being able to send spam into multiple protected networks.

In the case of receiving update information via one of the aforementioned channels, transaction analysis is foregone and the update information is aggregated with the current information the appliance might already have about the path(s) in question. The control process will then update the rules engine regarding the path(s) in question.

This further helps to push the burden of handling/processing/transmitting such undesirable communications toward and/or to the sender/sender's network, while relieving downstream networks of associated communication handling/processing burdens. For spam senders in particular, this disrupts the spammer's ability to deliver a high volume of undesirable communications. This further makes it inefficient for a spam sender to send undesirable communications to a network protected by such a network appliance, and discourages spam senders from repeated attempts to send such communications to such networks.

In addition to the synchronization of behavioral history between separate network appliances as described above, "control" information can be synchronized as well, so that the pool of resources available for control may actually be a virtual pool of resources across multiple systems and/or networks. For example, the number/rate/etc of connections or the bandwidth or other resources available for a class of network path might be controlled by limiting the access to that resource by all members of that class of path across all deployed network appliances or some subset. By way of further example, rather than allowing a given class 10Kbit of bandwidth at each protected network, the control process of the network appliance may allow that class 10Kbit of bandwidth across all protected networks. Accordingly, this may be used to create contention for a class-limited allocation of resources among a class of attacker is another technique used (e.g. to limit connections or bandwidth usable by an entire class of communications).

Inbound/Outbound

The network appliance 100 may also be used to operate on communications that are outward bound from an internal network, e.g. to lessen a burden on a protected network as a result of sending communications from that network to other networks. In such an arrangement, the network appliance 100 may be used to prevent the sending of unapproved e-mail messages or other network communications to certain receivers, to protect from abuse of the protected network's resources, and to protect the resources of other networks. In this manner, it can stop spam senders from abusing networks, or hijacked systems (e.g. via computer viruses) to send spam or other unwanted communications. In such an embodiment, the management interface 148 is preferably configured to identify a particular computer, username, etc. that is the source of such communications, so that disciplinary or other action may be taken to stop such abuse. Control mechanisms similar to those discussed above may be used.

In addition to limiting use of resources as percentage of available resources, the system may limit to a value not related to available resources, for example to create an artificially unattractive environment for the sending of spam communications.

Management Interface

In certain embodiments, the network appliance 100 is configured to provide a unique and valuable management interface, via a management interface module 148 (FIG. 2). In particular, the analysis performed by the system feeds an interface that is useful to administrators in monitoring and responding to abuse of their resources.

The network appliance's management interface permits operators of protected networks to adjust their preferences for customization and configuration of analysis modules, prioritization and squelching parameters, and prioritization of legitimate email paths. As well, they are able to adjust the priority level of paths they know about, for example to whitelist a known business customer's communications so that communications arriving on that path are given a predetermined allocation of resources, which results in a high priority. Alternatively, the interface may be used to temporarily blacklist paths that engage in illicit activity such as violation of the protected network's AUP, engaging in a dictionary attack, etc. as will be understood by those versed in the art. For example, this may be implemented using the Configured Prioritization parameters illustrated in FIG. 2 to influence a particular allocation/control of resources regardless of any analysis and/or results thereof. The management interfaces is preferably made available via a web browser by pointing the browser at the network appliance on a specified port.

Further the management interface permits such operators to query status information from the device, e.g. to track and report the last known path for spam communications. Specifically, squelch events (i.e., poorly behaved hosts) and excessive volume may be tied to manually and/or automatically detected. In some embodiments, spam communications are transmitted to a central host for logging. This aids in the identification of spam sources.

Additional Embodiments

Allocation of network resources can be based on estimates or guesses of what an otherwise unknown path's behavior will be, based on correlation to 'related' paths. For example, in the context of use of a CIDR block, a particular network path associated with a certain CIDR block may be treated, at least until further analysis is obtained, similar to another network path associated with the same CIDR block with respect to control and allocation of resources.

Further, the network appliance may be configured to use conditional analysis that allows different types of analysis on sampled traffic based on what previous analysis of the same traffic has indicated, or what analysis of previous traffic has indicated. Further, the network appliance may be used to control a path's ability to send e-mail based on the path's previous history of sending viruses. Further, gathered data may be used to assess potential behavior of a path based on the overall number of paths with good and bad behavior. For example, if it is observed that 80% of new paths are sending all spam, then it could be assumed that 80% of new paths in the future will send all spam and be treated accordingly once they actually start sending communications. Further, the network appliance may assess path behavior based on whether or not the path's content attempts to evade common spam filtering techniques. As a function of the path's content or current behavior, e.g. if they are sending viruses or worms via e-mail, the network appliance could have the option to temporarily blacklist the path for a period of time, in order to protect the protected network from virus or worm outbreaks.

Further, the network appliance may be configured to judge path behavior by the existence of influences outside the path's mail stream, such as the existence of SPF records for the sending domain, the existence of a reverse-DNS mapping for the sending IP address, predetermined behavioral qualifications from anecdotal evidence obtained from trusted anti-spam sources, etc, as will be appreciated by those skilled the art.

The network appliance has the capability to do advanced routing of traffic based on all of the data available to the system. The network appliance may make on-the-fly decisions about where to send traffic based on, for example, how likely that traffic is to be spam. For example, the network appliance may be used to send "good" traffic to one cluster, and "bad" traffic to a separate cluster which perhaps does more analysis.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for controlling distribution of network communications via a communications network, the method comprising:
    sampling a subset of a first plurality of network communications received along a first network path;
    sampling a subset of a second plurality of network communications received along a second network path;
    performing a statistical analysis of content within samples of said sampled subsets of said first and second pluralities of network communications to determine respective probabilities that the content carried on said first and second network paths are likely to have a certain characteristic, wherein the statistical analysis comprises determining values for sender metrics, the sender metrics reflecting quantities of communications on the first and second network paths having the certain characteristic;
    determining a corresponding priority level for each network path, each priority level determined according to said path's respective probability; and
    varying an allocation of network resources permitted to be used to transmit communications received along each of said network paths, said allocations being varied as a function of said corresponding priority levels;
    wherein a path having a higher corresponding priority level is allocated network resources to permit a rate of transmission of network communications that is greater than a corresponding rate of transmission for a path having a lower corresponding priority level.

2. The method of claim 1, wherein varying the allocation of network resources comprises varying a maximum segment size parameter for transmission of communications received along a corresponding network path.

3. The method of claim 1, wherein varying the allocation of network resources comprises varying a TCP receive window size parameter for transmission of communications received along a corresponding network path.

4. The method of claim 1, wherein varying the allocation of network resources comprises queuing a plurality of communications for transmission into a subnetwork, and selectively dequeuing said plurality of communications at a desired rate.

5. The method of claim 1, wherein varying the allocation of network resources comprises varying a maximum amount of usable bandwidth for transmission of communications received along a corresponding network path.

6. The method of claim 1, wherein varying the allocation of network resources comprises use of TCP traffic shaping.

7. The method of claim 1, wherein varying the allocation of network resources comprises use of IP traffic shaping.

8. The method of claim 1, wherein varying the allocation of network resources comprises use of connection shaping.

9. The method of claim 1, wherein said analyzing comprises identifying whether the communications on the first and second network paths comprise a virus.

10. The method of claim 1, wherein said analyzing comprises determining a proportion of the communications on the first and second network paths that are undeliverable to respective receivers.

11. The method of claim 1, wherein said analyzing comprises determining a proportion of the communications on the first and second network paths that are spam.

12. A method for controlling distribution of network communications via a communications network, the method comprising:
    determining a first priority level applicable to a first network path along which communications are received at a network appliance of a subnetwork responsive to a statistical analysis of a sampled subset of communications on said first network path to determine a first probability that the communications received on the first network path are likely to have a certain characteristic, the statistical analysis comprising determining a value for a first sender metric, the first sender metric reflecting a quantity of communications of the sampled subset of communications on the first network path having the certain characteristic;
    determining a second priority level applicable to a second network path along which communications are received at said network appliance responsive to a statistical analysis of a sampled subset of communications on said second network path to determine a second probability that the communications received on the second network oath are likely to have the certain characteristic, the statistical analysis comprising determining a value for a second sender metric, the second sender metric reflecting a quantity of communications of the sampled subset of communications on the second network path having the certain characteristic; and allocating network resources usable to deliver communications received along said first and second network paths via said network appliance, said network resources being allocated to cause communications received along said first and second network paths to have different corresponding maximum rates of transmission, the first network path having a different corresponding maximum rate than the corresponding maximum rate of the second network path responsive to a difference in the first and second probabilities of the first and second network paths.

13. A method for controlling distribution of network communications via a communications network, the method comprising:

identifying a network path for a plurality of packets transmitted by a network appliance;

sampling a subset of said plurality of packets;

performing a statistical analysis on the sampled subset of packets to determine a probability that the content carried on said network path is likely to have a certain characteristic, the analysis comprising determining a value for a sender metric reflecting a quantity of the sampled subset of packets sharing the certain characteristic; and controlling a transmission rate of packets on the network path, the particular control exercised being determined as a function of the probability.

14. The method of claim 13, wherein sampling a subset of said plurality of packets comprises:

temporarily storing copies of a subset of packets passing through the network appliance; and examining said copies.

15. The method of claim 14, wherein said examining occurs after said subset of packets has already passed through said network appliance.

16. The method of claim 13, wherein sampling a subset of said plurality of packets comprises:

temporarily storing copies of a subset of packets passing through said network appliance;

assembling said copies to identify details of an associated network protocol transaction; and examining said details.

17. The method of claim 16, wherein said assembling and said examining occur after said subset of packets have already passed through said network appliance.

18. The method of claim 13, wherein sampling a subset of said plurality of packets comprises:

temporarily storing copies of a subset of packets passing through said network appliance;

assembling said copies to construct an associated network protocol transaction; and examining content of said associated network protocol transaction.

19. The method of claim 18, wherein said assembling and said examining occur after said subset of packets have already passed through said network appliance.

20. The method of claim 13, wherein the sampling is performed according to a predetermined sampling rate.

21. The method of claim 13, wherein the sampling rate is varied over time.

22. The method of claim 21, wherein the sampling rate is varied as a function of the permitted transmission rate for a given network path.

* * * * *

UNITED STATES PATENT AND TRADEMARK OFFICE
CERTIFICATE OF CORRECTION

PATENT NO.        : 7,647,411 B1                      Page 1 of 1
APPLICATION NO.   : 10/841776
DATED             : January 12, 2010
INVENTOR(S)       : Vincent J. Schiavone et al.

It is certified that error appears in the above-identified patent and that said Letters Patent is hereby corrected as shown below:

In the Claims:

Column 24, line 66, delete "oath," and insert --path--.

Signed and Sealed this
Seventh Day of July, 2015

Michelle K. Lee
*Director of the United States Patent and Trademark Office*